(12) United States Patent
Raksha et al.

(10) Patent No.: US 12,311,691 B2
(45) Date of Patent: May 27, 2025

(54) ORIENTING MAGNETICALLY-ORIENTABLE FLAKES

(71) Applicant: VIAVI SOLUTIONS INC., San Jose, CA (US)

(72) Inventors: Vladimir P. Raksha, Santa Rosa, CA (US); Cornelis Jan Delst, Fairfax, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/516,418

(22) Filed: Nov. 1, 2021

(65) Prior Publication Data

US 2022/0056238 A1 Feb. 24, 2022

Related U.S. Application Data

(63) Continuation of application No. 16/330,021, filed as application No. PCT/US2017/049730 on Aug. 31, 2017, now Pat. No. 11,193,002.

(Continued)

(51) Int. Cl.
*B42D 25/29* (2014.01)
*B05D 3/00* (2006.01)
(Continued)

(52) U.S. Cl.
CPC .............. *B42D 25/29* (2014.10); *B05D 3/067* (2013.01); *B05D 3/207* (2013.01); *B05D 5/065* (2013.01);

(Continued)

(58) Field of Classification Search
CPC ................ G02F 1/10; G02F 1/10; G02B 5/08
See application file for complete search history.

(56) References Cited

U.S. PATENT DOCUMENTS

| 4,055,377 A | 10/1977 | Erickson et al. |
| 5,080,750 A | 1/1992 | Kurotaki et al. |

(Continued)

FOREIGN PATENT DOCUMENTS

| AU | 2007295876 A1 | 3/2008 |
| CA | 2600431 | 9/2006 |

(Continued)

OTHER PUBLICATIONS

International Search Report and Written Opinion dated Dec. 21, 2017, PCT Patent Application No. PCT/US2017/049730, filed Aug. 31, 2017, Russian Federal Institute of Industrial Property.

(Continued)

*Primary Examiner* — Tabassom Tadayyon Eslami
(74) *Attorney, Agent, or Firm* — Mannava & Kang, P.C.

(57) ABSTRACT

According to examples, a substrate may be moved through a magnetic field, in which the substrate includes a fluid carrier containing magnetically-orientable flakes. The magnetic field may influence the magnetically-orientable flakes to be respectively oriented in one of multiple orientations. In addition, during movement of the substrate through the magnetic field, radiation may be applied onto a plurality of selected portions of the fluid carrier through at least one opening in a mask to cure the fluid carrier at the plurality of selected portions and fix the magnetically-orientable flakes in the plurality of selected portions at the respective angular orientations as influenced by the magnetic field.

7 Claims, 19 Drawing Sheets

Related U.S. Application Data

(60) Provisional application No. 62/382,187, filed on Aug. 31, 2016.

(51) Int. Cl.

| | | |
|---|---|---|
| *B05D 3/06* | (2006.01) | |
| *B05D 5/06* | (2006.01) | |
| *B41M 7/00* | (2006.01) | |
| *B42D 25/30* | (2014.01) | |
| *B42D 25/324* | (2014.01) | |
| *B42D 25/369* | (2014.01) | |
| *B42D 25/41* | (2014.01) | |
| *C08K 3/01* | (2018.01) | |
| *C08K 7/00* | (2006.01) | |
| *C09D 5/23* | (2006.01) | |
| *C09D 7/40* | (2018.01) | |
| *G02B 5/124* | (2006.01) | |
| *G02B 5/136* | (2006.01) | |
| *G02B 5/18* | (2006.01) | |
| *G02B 17/00* | (2006.01) | |
| *B41M 3/14* | (2006.01) | |

(52) U.S. Cl.
CPC ........... *B41M 7/0072* (2013.01); *B42D 25/30* (2014.10); *B42D 25/324* (2014.10); *B42D 25/369* (2014.10); *B42D 25/41* (2014.10); *C08K 3/01* (2018.01); *C08K 7/00* (2013.01); *C09D 5/23* (2013.01); *C09D 7/70* (2018.01); *G02B 5/124* (2013.01); *G02B 5/136* (2013.01); *G02B 5/1861* (2013.01); *G02B 17/002* (2013.01); *B41M 3/14* (2013.01); *C08K 2201/01* (2013.01)

(56) References Cited

U.S. PATENT DOCUMENTS

| | | | |
|---|---|---|---|
| 5,364,689 A | 11/1994 | Kashiwagi et al. | |
| 5,840,405 A | 11/1998 | Shusta | |
| 6,017,657 A | 1/2000 | Mentz et al. | |
| 6,024,455 A | 2/2000 | O'Neill et al. | |
| 6,759,097 B2 | 7/2004 | Phillips et al. | |
| 7,047,883 B2 | 5/2006 | Raksha et al. | |
| 7,258,900 B2 | 8/2007 | Raksha et al. | |
| 7,468,842 B2 | 12/2008 | Steenblik et al. | |
| 7,604,855 B2 | 10/2009 | Raksha et al. | |
| 7,717,038 B2 | 5/2010 | Raksha et al. | |
| 7,738,175 B2 | 6/2010 | Steenblik et al. | |
| 7,830,627 B2 | 11/2010 | Commander et al. | |
| 7,934,451 B2 | 5/2011 | Raksha et al. | |
| 8,004,767 B2 | 8/2011 | DeVoe et al. | |
| 8,027,093 B2 | 9/2011 | Commander et al. | |
| 8,077,393 B2 | 12/2011 | Steenblik et al. | |
| 8,111,462 B2 | 2/2012 | Steenblik et al. | |
| 8,144,399 B2 | 3/2012 | Steenblik et al. | |
| 8,254,030 B2 | 8/2012 | Steenblik et al. | |
| 8,286,551 B2 | 10/2012 | Gygi | |
| 8,343,615 B2 | 1/2013 | Raksha et al. | |
| 8,499,687 B2 | 8/2013 | Gygy et al. | |
| 9,102,195 B2 | 8/2015 | Raksha et al. | |
| 11,186,110 B2 | 11/2021 | Raksha et al. | |
| 2002/0154423 A1 | 10/2002 | Gubela | |
| 2002/0182383 A1* | 12/2002 | Phillips | C09C 1/0051 428/199 |
| 2004/0166308 A1 | 8/2004 | Raksha et al. | |
| 2006/0198998 A1* | 9/2006 | Raksha | G02B 5/09 428/323 |
| 2006/0097515 A1 | 11/2006 | Raksha et al. | |
| 2007/0109641 A1 | 5/2007 | Mirura | |
| 2007/0200002 A1 | 8/2007 | Raksha et al. | |
| 2008/0258456 A1 | 10/2008 | Rahm et al. | |
| 2009/0200791 A1 | 8/2009 | Despland et al. | |
| 2010/0021658 A1 | 1/2010 | Raksha et al. | |
| 2010/0040845 A1 | 2/2010 | Schmid et al. | |
| 2011/0221431 A1 | 9/2011 | Kwon et al. | |
| 2012/0091699 A1 | 4/2012 | Krueger et al. | |
| 2012/0162344 A1 | 6/2012 | Raksha et al. | |
| 2012/0205905 A1* | 8/2012 | Degott | B42D 25/40 427/7 |
| 2013/0084411 A1* | 4/2013 | Raksha | G02B 26/026 428/29 |
| 2013/0189454 A1 | 7/2013 | Raksha et al. | |
| 2014/0077485 A1 | 3/2014 | Raksha et al. | |
| 2015/0004276 A1 | 1/2015 | Kojima et al. | |
| 2015/0231912 A1 | 8/2015 | Yoon et al. | |
| 2015/0258838 A1 | 9/2015 | Fuhse | |
| 2016/0023495 A1 | 1/2016 | Fuhse et al. | |
| 2016/0187546 A1 | 6/2016 | Raksha et al. | |
| 2017/0082787 A1 | 3/2017 | Yashiki | |
| 2022/0048308 A1 | 2/2022 | Raksha et al. | |

FOREIGN PATENT DOCUMENTS

| | | | |
|---|---|---|---|
| CN | 101434176 A | | 5/2009 |
| CN | 101688937 A | | 3/2010 |
| CN | 101767511 A | | 7/2010 |
| CN | 102712205 A | | 10/2012 |
| CN | 103338871 A | | 10/2013 |
| CN | 103911584 A | | 7/2014 |
| CN | 104191860 A | | 12/2014 |
| CN | 104284738 | | 1/2015 |
| DE | 10 2009 016533 | * | 10/2010 |
| DE | 102013019944 | | 5/2015 |
| EP | 0710576 | | 8/1996 |
| EP | 1961559 A1 | | 8/2008 |
| EP | 2418019 A1 | | 2/2012 |
| EP | 2417204 | * | 2/2014 |
| EP | 3000613 A1 | | 3/2016 |
| EP | 3178569 | | 6/2017 |
| JP | H02222476 A | | 9/1990 |
| JP | 2001228316 | | 8/2001 |
| JP | 2003022526 | | 1/2003 |
| JP | 2011064908 A | | 3/2011 |
| KR | 20060032346 A | | 4/2006 |
| KR | 1020070112428 | | 11/2007 |
| KR | 20090066826 A | | 6/2009 |
| KR | 1020110058700 | | 6/2011 |
| WO | 2004007095 A2 | | 1/2004 |
| WO | 2008139373 A1 | | 11/2008 |
| WO | 2010058026 A2 | | 5/2010 |
| WO | 2010/100360 | | 9/2010 |
| WO | 2010115803 A2 | | 10/2010 |
| WO | 2011092502 A2 | | 8/2011 |
| WO | 2014060089 A2 | | 4/2014 |
| WO | 2015095189 A1 | | 6/2015 |
| WO | 2016015973 | | 2/2016 |
| WO | 2016/083259 | * | 6/2016 |
| WO | 2019141452 A1 | | 7/2019 |

OTHER PUBLICATIONS

International Search Report and Written Opinion dated Jan. 25, 2018, PCT Patent Application No. PCT/US2017/049735, filed Aug. 31, 2017, Russian Federal Institute of Industrial Property.

"MEMS Design and Fabrication", 1st Edition, Mohamed Ged-el-Hak (U.S.A), p. 310, China Machine Press, Feb. 28, 2010 with machine English translation, 6 pages.

"MEMS Technology Foundation and Application", 1st Edition, Chengjun Qiu, et al., p. 35, Harbin Institute of Technology Press, Feb. 28, 2010, with machine English translation, 6 pages.

"Nanoscale Science and Technology", 1st Edition, Zhejun Yuan, p. 500, Harbin Institute of Technology Press, Aug. 31, 2005, with machine English translation, 7 pages.

Giesecke+Devrient, "RollingStar®: bright and eye-catching", downloaded from the Internet on Sep. 25, 2024, 5 pages. <https://www.gi-de.com/en/currency-technology/banknote-solutions/banknote-security-technology/security-threads/rollingstar-security-threads>.

"A path to the next generation of US banknotes". National Research Council, ISBN-13 978-0-309-10578-1, (Year 2007), p. 198, Appen-

(56) References Cited

OTHER PUBLICATIONS dix C Intermediate-Term Feature Descriptions. National Research Council. 2007. A Path to the Next Generation of U.S. Banknotes: Keeping Them Real. Washington, DC: The National Academies Press. doi: 10.17226/11874.x.

Alan J. DeWeerd et al., "Reflection with a Twist: The Helical Mirror", The Physics Teacher, vol. 44, Nov. 2006, pp. 496-497.

Julien Chopin et al., "Helicoids, Wrinkles, and Loops in Twisted Ribbons", Physical Review Letters, PRL111, 174302—Published Oct. 25, 2013, 5 pages.

Vladimir Raksha et al., "Printable Appearance-Changing Graphical Security Devices", Proceedings of the Optical Document Security Conference, San Francisco, Jan. 23-25, 2008, p. 170-184.

Wikipedia, "Tacoma Narrows Bridge (1940)", Downloaded from the Internet on Sep. 23, 2024, 16 pages. <https://en.wikipedia.org/wiki/Tacoma_Narrows_Bridge_%281940%29>.

"Infosecura", Intergraf International Security Printers Conference, Copenhagen Apr. 22-24, 2015, 20 pages.

European Patent Office, "The extended European Search Report for Application No. EP24193227.6", dated Mar. 21, 2025, 19 pages.

\* cited by examiner

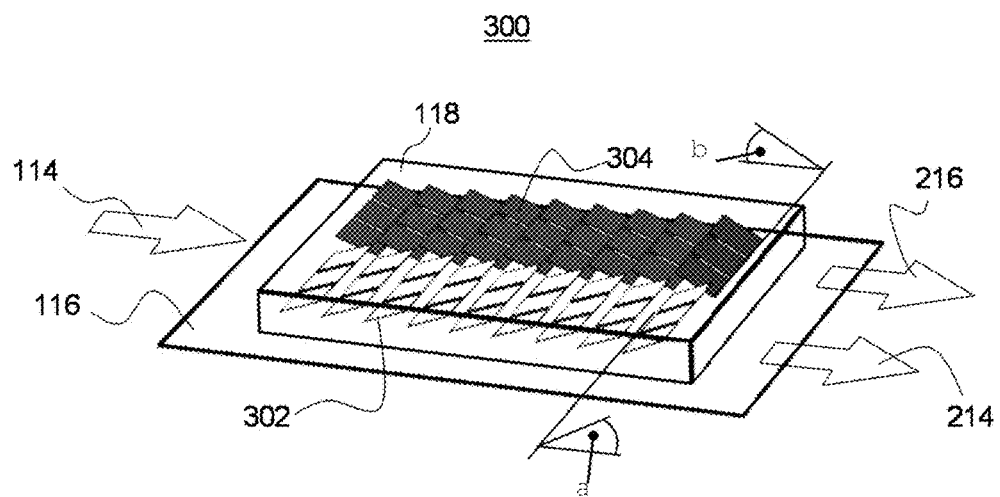
FIG. 3A
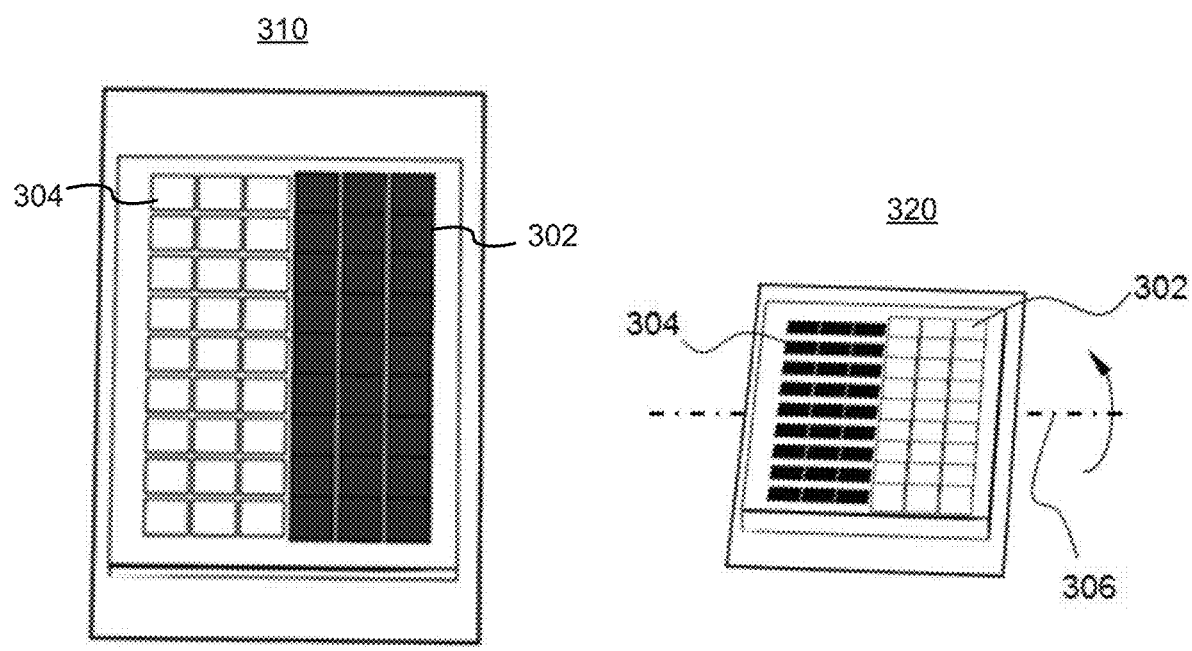
FIG. 3B
FIG. 3C

700

OPTIONALLY APPLY A LIQUID COATING CONTAINING MAGNETIC
FLAKES ONTO A SUBSTRATE
702

↓

MOVE THE SUBSTRATE THROUGH A MAGNETIC FIELD
704

↓

DURING MOVEMENT OF THE SUBSTRATE, APPLY RADIATION
ONTO A PLURALITY OF SELECTED PORTIONS OF THE LIQUID
COATING THROUGH AT LEAST ONE OPENING IN A MASK TO
CURE THE LIQUID COATING THE SELECTED PORTIONS
706

MOVE A SUBSTRATE THROUGH A MAGNETIC FIELD AND A
RADIATION FOOTPRINT
802

↓

DURING MOVEMENT OF THE SUBSTRATE, PROVIDE RADIATION
TO A PORTION OF THE SUBSTRATE WHEN THE PORTION IS IN AN
EXTENT OF A LEADING EDGE OF THE RADIATION FOOTPRINT
804

MOVE A SUBSTRATE WITH WET INK RELATIVE TO AN EXTERNAL MAGNETIC INDUCTION AND A RADIATION FOOTPRINT, THE WET INK CONTAINING MAGNETIC FLAKES
902

CURE THE WET INK CONTAINING THE MAGNETIC FLAKES AS THE WET INK IS MOVING IN THE RADIATION FOOTPRINT
904

MOVE A SUBSTRATE WITH WET INK RELATIVE TO AN EXTERNAL MAGNETIC INDUCTION AND A RADIATION FOOTPRINT, THE WET INK CONTAINING MAGNETIC FLAKES
1002

MOVE A SUBSTRATE WITH WET INK RELATIVE TO AN EXTERNAL MAGNETIC INDUCTION AND A RADIATION FOOTPRINT, THE WET INK CONTAINING MAGNETIC FLAKES
1004

CURE THE WET INK CONTAINING THE MAGNETIC FLAKES AS THE WET INK IS MOVING IN THE RADIATION FOOTPRINT
1006

FIG. 10

ORIENTING MAGNETICALLY-ORIENTABLE FLAKES

CLAIM FOR PRIORITY AND CROSS REFERENCE TO RELATED APPLICATION

This application is a Continuation of commonly assigned and co-pending U.S. patent application Ser. No. 16/330,021, filed Mar. 1, 2019, which claims priority to 35 U.S.C. § 371 of PCT application number PCT/US2017/049730, having an international filing date of Aug. 31, 2017, which claims the benefit of priority to U.S. Provisional Patent Application Ser. No. 62/382,185, filed on Aug. 31, 2016 and entitled "ORIENTING MAGNETICALLY-ORIENTABLE FLAKES", the disclosures of which are hereby incorporated by reference in their entireties. This application also contains similar subject matter to, PCT application No. PCT/US2017/049735, having an international filing date of Aug. 31, 2017, the disclosure of which is hereby incorporated by reference in its entirety.

BACKGROUND

Optically variable devices are used in a wide variety of applications, both decorative and utilitarian. Optically variable devices can be made in a variety of ways to achieve a variety of effects. Examples of optically variable devices include the holograms imprinted on credit cards and authentic software documentation, color-shifting images printed on banknotes, and enhanced surface appearances of items such as motorcycle helmets and wheel covers.

Optically variable devices can be made as a film or a foil that is pressed, stamped, glued, or otherwise attached to an object, and can also be made with optically variable pigments embedded into an organic binder that is printed or coated onto a hard or flexible substrate. One type of optically variable pigment is commonly called a color-shifting pigment because the apparent color of images appropriately printed with such pigments changes with a change of the angle of observation. A common example is the "20" printed with color-shifting pigment in the lower right-hand corner of a U.S. twenty-dollar bill, which serves as an anti-counterfeiting device.

BRIEF DESCRIPTION OF THE DRAWINGS

Features of the present disclosure are illustrated by way of example and not limited in the following figure(s), in which like numerals indicate like elements, in which:

FIGS. 3A-3E, respectively, show views of a region of a fluid carrier in which magnetically-orientable flakes have been oriented, according to an example of the present disclosure;

FIGS. 7-10, respectively, depict flow diagrams of methods for orienting magnetically-orientable flakes, according to examples of the present disclosure.

DETAILED DESCRIPTION

Figure 1A:
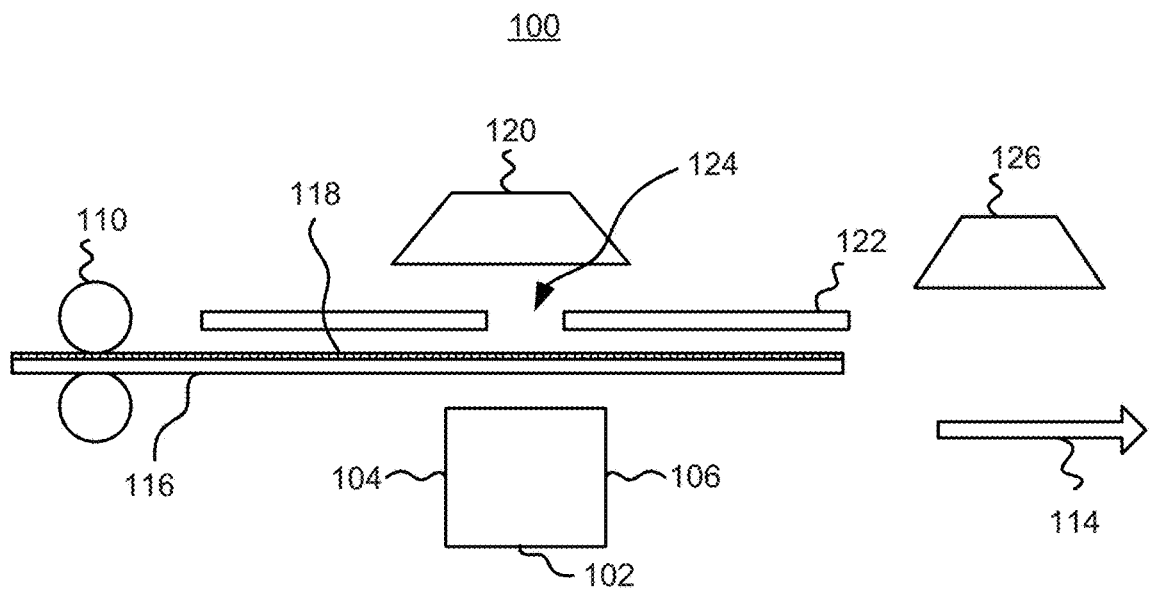
FIGS. 1A-1E, respectively, schematically show several apparatuses for orienting magnetically-orientable flakes, according to examples of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on. As used herein, the terms "substantially," "approximately," and "about" indicate a range of values within +/−5% of a stated value.

It should be noted that the elements depicted in the accompanying figures may include additional components and that some of the components described in those figures may be removed and/or modified without departing from scopes of the present disclosure. Further, the elements depicted in the figures may not be drawn to scale and thus, the elements may have sizes and/or configurations that differ from those shown in the figures.

Disclosed herein are apparatuses and methods for orienting magnetically-orientable flakes in a fluid carrier. Particularly, the apparatuses and methods disclosed herein may cause the magnetically-orientable flakes dispersed in the fluid carrier to be oriented in manners that may cause a kinematic optical effect to be obtained, e.g., a band or multiple bands of light reflected from the magnetically-orientable flakes move in directions that are perpendicular to the direction in which an optical element containing the fluid carrier is tilted. In one regard, the magnetically-orientable flakes may be oriented in this manner by subjecting the magnetically-orientable flakes to a magnetic field in which one or more magnetic field lines extend co-linearly with the direction in which a substrate upon which the fluid carrier is fed. In addition, the magnetically-orientable flakes may be fixed in desired orientations through use of a mask containing at least one opening, in which the mask and the at least one opening may be strategically positioned with respect to the magnetic field to cause the magnetically-orientable flakes to be fixed at a desired dihedral angle with respect to the substrate by a radiation source when the magnetically-orientable flakes are aligned with magnetic field lines that penetrate the substrate. Moreover, multiple layers of fluid carriers having magnetically-orientable flakes may be provided and cured to create images having various optical effects.

The at least one opening of the mask disclosed herein may be any shape, size, or have any orientation. In some examples, the at least one opening may be surrounded on all sides by the mask (e.g., openings 124 of the mask shown in FIG. 2A). In other examples, the at least one opening may have at least one open side (e.g., openings 402 of FIGS. 4A, 4B, and 4D). In some examples, the at least one opening may have one or more straight sides. Additionally or alternatively, the at least one opening may have one or more curved sides.

The apparatuses and methods disclosed herein may also cause the magnetically-orientable flakes to be fixed while the substrate is continuously fed through the magnetic field. In this regard, the apparatuses and methods disclosed herein may be implemented to print and orient the magnetically-orientable flakes in a high-speed manner. Moreover, the apparatuses and methods disclosed herein may be implemented to generate highly noticeable movement of light bands across optical elements. The optical elements may be provided, for instance, on financial documents, such as banknotes, currency, stock certificates, etc., or other products such as software documentation, security seals, and similar objects as authentication and/or anti-counterfeiting devices.

A dispersion of magnetically-orientable flakes in a fluid carrier as discussed herein may alternatively be described as a dispersion of magnetically-orientable flakes or magnetizable flakes in a liquid coating, in wet ink (whether water-borne or solvent-borne, liquid ink, paste-like ink, or the like), in uncured paint (whether water-borne or solvent-borne), in an uncured organic binder, in an uncured organic carrier, in an uncured organic vehicle, etc.

It should be understood that the phenomenon of changing the position and alignment of one or more magnetically-orientable flakes through application of a magnetic field whose source is external to the same one or more magnetically-orientable flakes may be described in a number of ways. The present disclosure describes alignment/orientation of magnetically-orientable flakes in the direction of the magnetic field. Alignment/orientation of magnetically-orientable flakes may additionally or alternatively be described in the direction of the magnetic field (the direction of a magnetic field may be defined as being tangent to the field line at any point in space). In other examples, alignment/orientation of magnetically-orientable flakes may be described by an external magnetic vector force.

FIG. 1A shows a schematic diagram of an apparatus 100 for orienting magnetically-orientable flakes, according to an example of the present disclosure. As shown, the apparatus 100 may include a magnet 102 having a first pole 104 and a second pole 106. The first pole 104 may have a first polarity and the second pole 106 may have a second, opposite polarity. For instance, the first pole 104 may be the south pole of the magnet 102 and the second pole 106 may be the north pole of the magnet 102. In other examples, the first pole 104 may be the north pole and the second pole 106 may be the south pole. As discussed in greater detail herein below, the opposite poles of the magnet 102 may apply a magnetic field having magnetic field lines emanating from the magnet 102. Magnetic vector forces, which may also be termed "magnetic induction," may be defined as forces that may be applied by the magnetic field in various directions that emanate from the magnet 102. For example, one of the poles of the magnet 102 may face the bottom surface of the substrate, e.g., the surface of the substrate opposite the surface containing the fluid carrier.

The apparatus 100 is also depicted as including a feeding mechanism 110 in the form of a pair of rollers arranged to feed a substrate 116 in a feed direction 114. Although the substrate 116 has been depicted as being directly fed by the rollers, the substrate 116 may instead be supported on a support (not shown). Other kinds of feeding mechanisms are possible within a scope of the apparatus 100. The support, if employed, may be a belt, a platform, one or more rows of grippers, a frame, or the like, and may support the substrate 116 such that the substrate 116 may be moved in the feed direction 114 along with the support. In various examples, the apparatus 100 may include additional feeding mechanisms (not shown) provided upstream and/or downstream of the feeding mechanism 110.

The substrate 116 may be formed of paper, plastic film, laminate, card stock, or the like. In a particular example, the substrate 116 is a banknote that may be cut into currency. The substrate 116 may also be in a continuous roll, or a sequence of substrate sheets, or have any discrete or continuous shape. In addition, at least a portion of an upper surface of the substrate 116 may be coated with a fluid carrier 118 in which magnetically-orientable particles or flakes are dispersed. The fluid carrier 118 may also be termed an ink, a wet ink, a coating, a fluid coating, or the like. The fluid carrier 118 may be applied through a printing technique such as gravure, ink-jet printing, flexographic, Intaglio, silk screen printing, painting, etc. The fluid carrier 118 may be in the form of ink or paint and may remain in a fluid form for at least a predetermined length of time or until a sufficient amount of energy is applied onto the fluid carrier 118. For instance, the fluid carrier 118 may be a liquid or a paste-like carrier and may be curable through receipt of energy in the form of ultra-violet (UV) light, electron beam, heat, laser, etc. By way of particular example, the fluid carrier 118 may be a photopolymer, a solvent-based carrier, a water-based carrier, or the like. In addition, the fluid carrier 118 may be transparent, either clear, colorless, or tinted.

According to examples, the fluid carrier 118 with the magnetically-orientable flakes may be applied onto the substrate 116 immediately prior to the substrate 116 being fed over the magnet 102 such that the fluid carrier 118 remains in a fluid state as the fluid carrier 118 is moved over the magnet 102. In this example, the feeding mechanism 110 or another mechanism (not shown), such as a printing mechanism, of the apparatus 100 may apply the fluid carrier 118 with the magnetically-orientable flakes onto the substrate 116 as the substrate 116 is fed in the feed direction 114.

The magnetically-orientable flakes may be mixed into the fluid carrier 118 prior to or after the fluid carrier 118 has been applied onto the substrate 116. According to examples, the magnetically-orientable flakes are non-spherical and planar flakes, e.g., pigment flakes that may be aligned using a magnetic field, and may be reflective and/or may be color shifting, e.g., the magnetically-orientable flakes may appear to have one color at one observation angle and another color at another observation angle. The magnetically-orientable flakes may or may not retain remnant magnetization. By way of example, a magnetically-orientable flake may be anywhere from about 1 to about 500 micrometers across and anywhere from about 0.1 to about 100 micrometers thick. In addition, the magnetically-orientable flakes may include a metallic layer, such as a thin film of aluminum, gold, nickel, platinum, metal alloy, etc., or may be a metal flake, such as a nickel, iron, or alloy flake. In addition or in other examples, the magnetically-orientable flakes may be coated with a tinted layer, or may include an optical interference structure, such as an absorber-spacer-reflector Fabry-Perot type structure.

The magnetically-orientable flakes viewed normal to the plane of the magnetically-orientable flakes may appear bright, while magnetically-orientable flakes viewed along the edge of the plane may appear dark. For example, light from an illumination source (not shown) may be reflected off the magnetically-orientable flakes to an observer when the magnetically-orientable flakes are in a position normal to the observer. However, if the magnetically-orientable flakes are tilted with respect to the plane normal to the observer, the magnetically-orientable flakes may be viewed on edge and may thus appear dark. Similarly, if the magnetically-orientable flakes are color-shifting, the magnetically-orientable flakes may appear to be one color when viewed along the normal plane and another color or darker when viewed along a tilted plane. Although particular reference is made herein to magnetically-orientable flakes being caused to be aligned with the direction of the magnetic field of at least one magnet, it should be understood that in instances, less than all of the magnetically-orientable flakes may become aligned with the direction of the magnetic field while still resulting in desired optical effects.

According to examples, the substrate 116 may be moved through the magnetic field of the magnet 102 before the fluid carrier 118 sets or dries to enable the magnetically-orientable flakes to become oriented in the direction of the magnetic field. That is, the feeding mechanism 110 may feed the substrate 116 along the feed direction 114 such that the magnetically-orientable flakes in the fluid carrier 118 are fed through the magnetic field applied by the first pole 104 and the second pole 106 of the magnet 102. The magnetic field may be depicted as having lines of magnetic field (flux density) emanating from the poles of the magnet. Alternatively, as discussed in greater detail herein below, the magnetic field may be described as being composed of vector forces and the magnetically-orientable flakes may become closely aligned with the vector forces. In addition, as the vector forces are not uniform across the magnet 102, the orientations of the magnetically-orientable flakes may vary depending upon the locations of the magnetically-orientable flakes with respect to the first pole 104 and the second pole 106. As such, the orientations of the magnetically-orientable flakes may change as the substrate 116 is fed through the magnetic field applied by the first pole 104 and the second pole 106. In other words, the dihedral angle of magnetically-orientable flakes may change with respect to a plane of the substrate 116. A dihedral angle may be defined as the angle between two planes in a third plane which cuts the line of intersection at right angles.

As also shown in FIG. 1A, the apparatus 100 may include a radiation source 120 (or an array of radiation sources 120), which may apply radiation onto the fluid carrier 118 to cure or otherwise solidify the fluid carrier 118 as the substrate 116 is fed in the feed direction 114. The radiation source 120 may apply radiation in the form of ultra-violet (UV) light, electron beam, heat, laser, or the like. A mask 122 having at least one opening 124 is also depicted as being positioned between the radiation source 120 and the fluid carrier 118 to control which portion or portions of the fluid carrier 118 receives radiation from the radiation source 120 as the substrate 116 passes by the radiation source 120. The locations on which radiation is incident to the substrate 116 through the at least one opening may be considered a radiation footprint. The mask 122 may have a thickness in the range of between about 0.25 mm to 2.5 mm (0.01" to about 0.1"). According to examples, the at least one opening 124 is strategically positioned with respect to the magnet 102 and the radiation source 126 to cause the magnetically-orientable flakes to be at least partially fixed at predetermined orientations while preventing other magnetically-orientable flakes from being at least partially fixed at other orientations. As discussed in greater detail herein below, the opening or openings 124 may be positioned to at least partially fix the magnetically-orientable flakes to be in a helical or bi-helical arrangement with respect to each other along a direction that is perpendicular (or equivalently, orthogonal or transverse) to the feed direction 114 and substantially lying within the plane of the substrate 116.

Further shown in FIG. 1A is a second radiation source 126, which may also apply energy onto the fluid carrier 118 in the form of ultra-violet (UV) light, electron beam, heat, or the like. The second radiation source 126 may apply the same type of energy or a different type of energy as compared with the radiation source 120. In any regard, the second radiation source 126 may be optional and, if present, may be implemented to further solidify the fluid carrier 118.

Figure 1B:
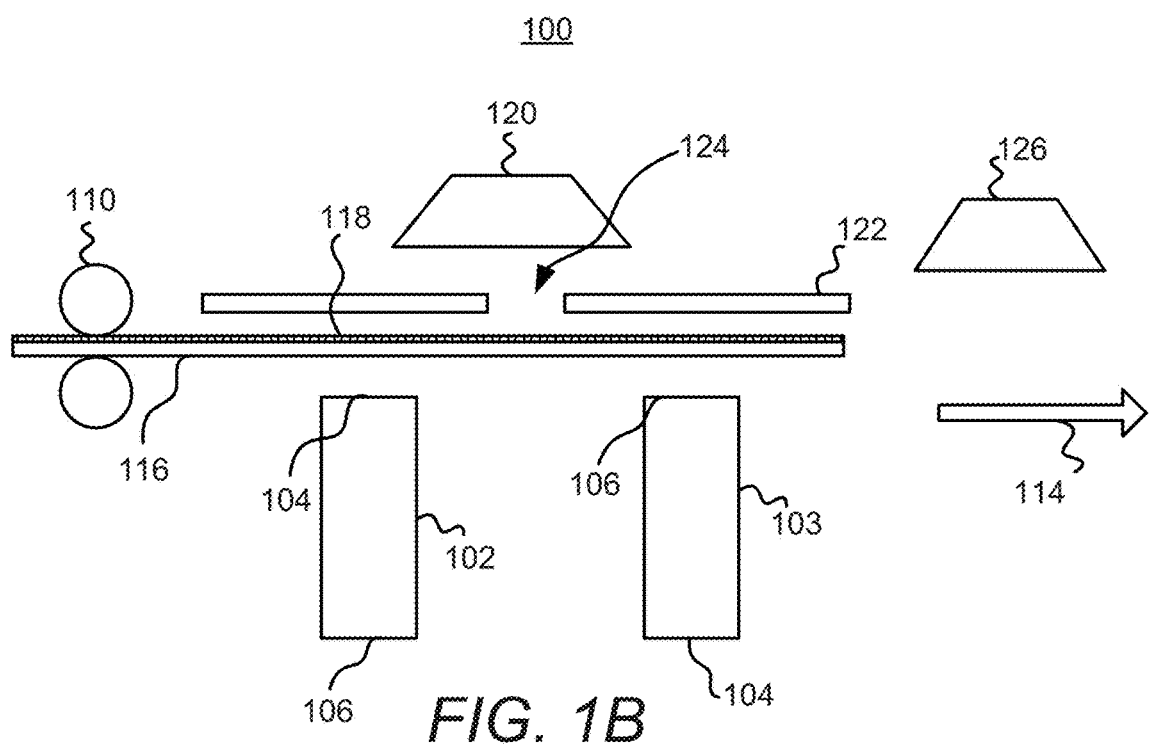

Turning now to FIG. 1B, there is shown a schematic diagram of an apparatus 100 for orienting magnetically-orientable flakes according to another example of the present disclosure. The apparatus 100 depicted in FIG. 1B includes many of the same features as those described above with respect to FIG. 1A and thus, those common features will not be described in detail with respect to FIG. 1B. However, the apparatus 100 depicted in FIG. 1B differs from the apparatus 100 depicted in FIG. 1A in that the apparatus 100 includes a second magnet 103 positioned in sequence with the first magnet 102 along the feed direction 114. In addition, the second magnet 103 is depicted as being rotated with respect to the first magnet 102 such that the second pole 106 is positioned closer to the substrate 116 than the first pole 104 of the second magnet 103. In this regard, opposite poles of the magnets 102 and 103 are closer to the substrate 116. As such, the magnets 102 and 103 may generate a similar magnetic field to the magnetic field generated by the single magnet 102 depicted in FIG. 1A.

In other examples, the apparatus 100 may include an additional or additional magnets to form a magnetic field that results in the magnetically-orientable flakes being aligned in desired orientations.

The apparatus 100 may be designed so that as the substrate 116 moves the fluid carrier 118 to positions near a magnet 102 or magnets 102/103, a magnetically-orientable flake in the fluid carrier 118 near the magnet(s) 102/103 will experience a torque according to the local magnetic induction experienced by that magnetically-orientable flake. If the torque is sufficiently strong, the magnetically-orientable flake in uncured ink will rotate about an axis parallel to the substrate 116 motion until the magnetically-orientable flake is substantially aligned with the local magnetic induction. The torque experienced by a magnetically-orientable flake depends upon the local magnetic induction at that magnetically-orientable flake, where the local magnetic induction is a vector sum of all external magnetic induction. In practice, unwanted sources of magnetism may be sufficiently isolated from where curing takes place so that their contribution to the total local magnetic induction may be neglected when compared to the magnetic induction provided by the magnet (s) 102/103. For example, it may be undesirable for the parasitic magnetic induction emanating from an electric motor to interfere with the alignment of magnetically-orientable flakes just before curing takes place. Accordingly, the magnetic induction provided by the magnet(s) 102/103 may be termed the external magnetic induction, it being understood that the external magnetic induction is the magnetic induction due to the magnet(s) 102/103, or due to one or more magnets purposefully positioned in the apparatus 100 for the purpose of tilting and orienting the magnetically-orientable flakes. The magnet(s) 102/103 may be a permanent magnet or an electromagnet, and may include an assembly of such magnets. Accordingly, it is sufficient to refer to the external magnetic induction when describing various embodiments without necessarily reciting a particular magnet or magnet assembly. Furthermore, often the terms "external magnetic induction" and "external magnetic induction vector" are used interchangeably.

Figure 1C:
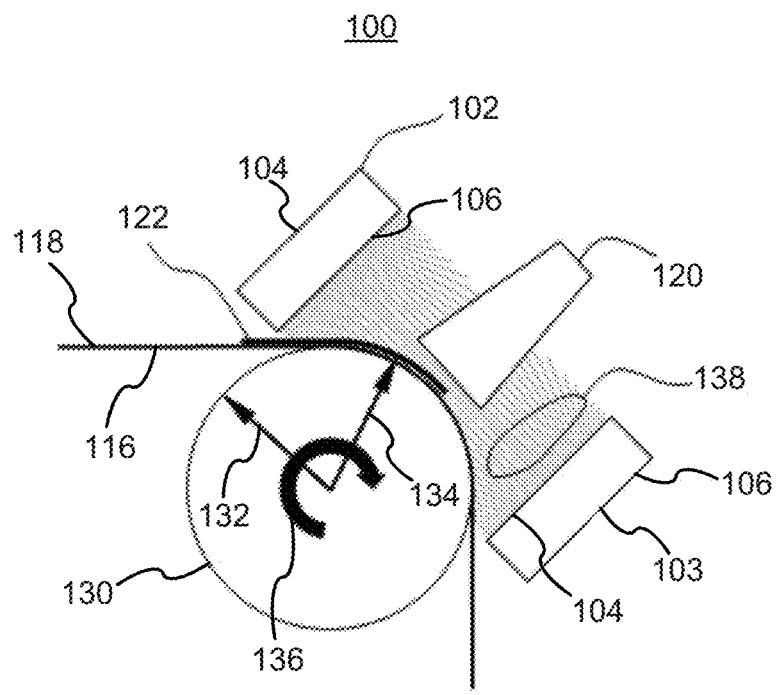
Figure 1D:
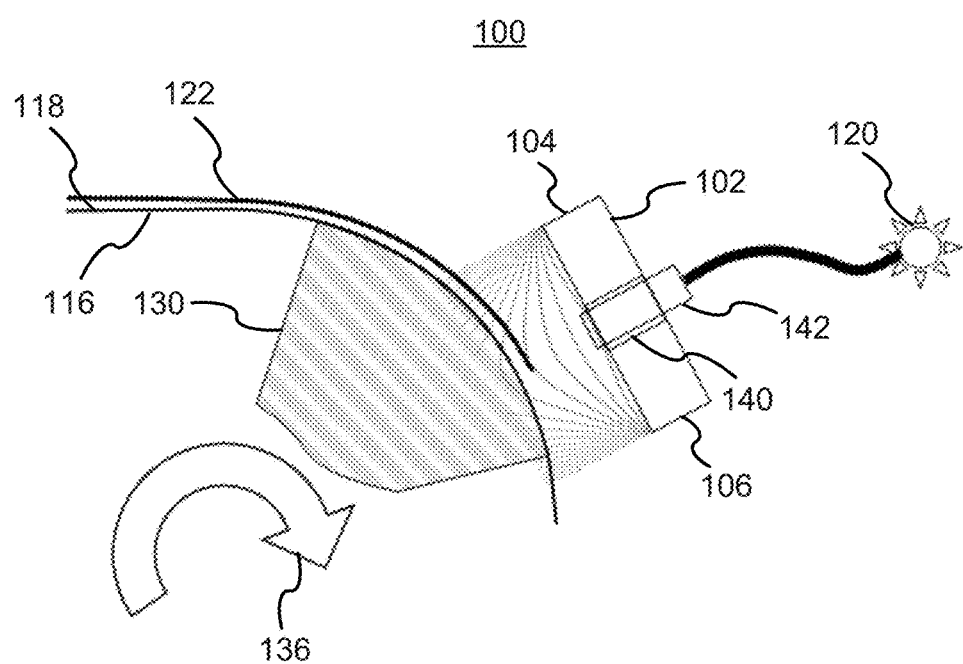
Figure 1E:
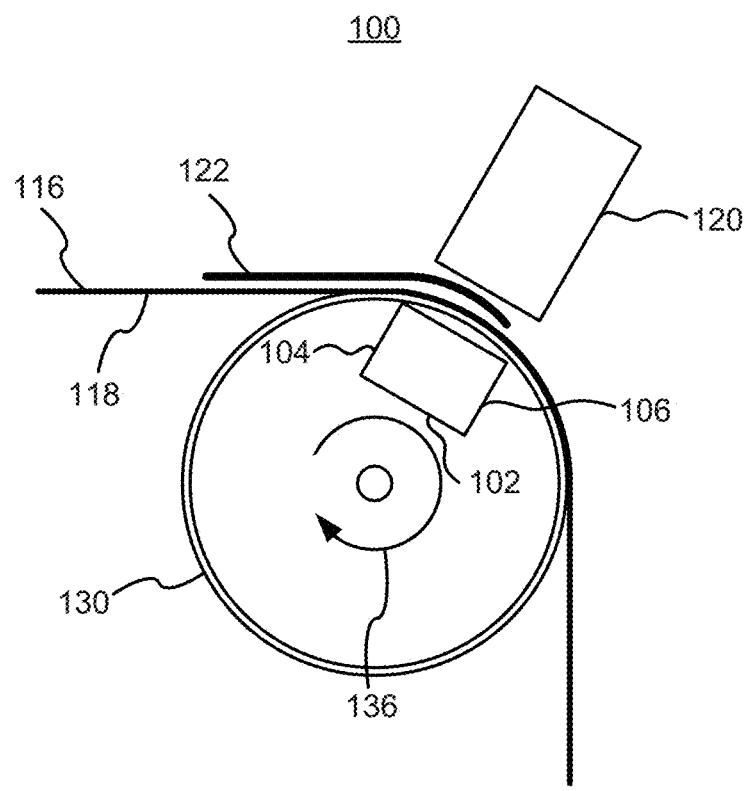

With reference now to FIGS. 1C-1E, there are respectively shown schematic diagrams of apparatuses 100 for orienting magnetically-orientable flakes according to additional examples of the present disclosure. As shown in FIG. 1C, the substrate 116 may be a flexible substrate and may be supported by a roller 130 having a radius 132. The roller 130 may be formed of a non-magnetic material, for instance, a plastic material, a rubber material, a ceramic material, etc. A fluid carrier 118 containing magnetically-orientable flakes may be provided on an upper surface of the substrate 116 (e.g., the surface of the substrate substantially facing the magnets 102 and 103 and/or radiation source 120 and substantially opposite the roller 118). The apparatus 100 depicted in FIG. 1C may include magnets 102 and 103 that are positioned with respect to the roller 130 such that their opposing poles 104 and 106 form a magnetic field through which portions of the substrate 116 are fed as the roller 130 rotates in the direction denoted by the arrow 136. The magnetic field, which may be represented by the lines 138, may include vector forces whose respective directions are substantially parallel to each other in the middle of the magnetic field, and a radiation source 120 may be positioned to apply energy onto the fluid carrier 118 close to a central location between the magnets 102 and 103. FIG. 1C thus shows an example in which the substrate 116 instantaneously moves along the north-south cardinal direction of at least a nearly linear magnetic field (e.g., a low degree of magnetic line curvature).

Similarly to the apparatus 100 depicted in FIGS. 1A and 1B, the radiation source 120 depicted in FIG. 1C may apply radiation onto the fluid carrier 118 to cause at least partial solidification of the fluid carrier 118. In addition, a mask 122 including at least one opening 124 (not shown) may be positioned between the radiation source 120 and the roller 130 to selectively block application of the radiation from the radiation source 120 onto the fluid carrier 118 (e.g., create the radiation footprint) and thus control the orientations at which the magnetically-orientable flakes may be fixed within the fluid carrier 118. According to examples, the mask 122 may be positioned a distance 134 from a center of the roller 130 such that a difference between the radius 132 of the roller 130 and the distance 134 is a value ranging from about 0.05 mm to about 6.25 mm (about 0.002 inches to about 0.25 inches).

FIG. 1D shows a similar arrangement to the arrangement shown in FIG. 1C, except that the magnetic field generation is different. That is, instead of the linear field generated in FIG. 1C, in FIG. 1D, the generated magnetic field is substantially curved at a location on the substrate 116 at which the radiation source 120 applies radiation. As shown, the magnet 102 may include a hole 140 through which a light guide 142 from the radiation source 120 may be inserted. Alternatively, however, multiple magnets may be positioned to generate the magnetic field shown in FIG. 1D. It should be noted that hole 140, light guide 142, and/or multiple magnets may be used with any apparatus and/or arrangement, including but not limited to the apparatuses of FIGS. 1A-C and 1E.

FIG. 1E shows a similar arrangement to the arrangement shown in FIG. 1C, except that the magnet 102 is positioned within the roller 130. That is, the roller 130 depicted in FIG. 1E may be a hollow cylinder and the magnet 102 may be positioned inside of the roller 130. In addition, the magnet 102 may be held in a stationary manner such that the magnet 102 does not move or rotate as the roller 130 is rotated. In other words, the magnet 102 may be maintained in a fixed spatial relationship with respect to the radiation source 120. In addition, the magnetic field through which portions of the substrate 116 may be moved may differ from the magnetic fields shown in FIGS. 1C and 1D.

In each of the examples discussed above, the substrate 116 has been described as being moved by a cylindrical roller 130. In other examples, however, instead of a roller 130, the apparatus 100 may include a curved surface on which the substrate 116 may be in sliding contact. In addition, or alternatively, the substrate 116 may have a curved shape that may be supported on a curved surface, such as a roller 130, or may be supported in other manners. By way of example, the substrate 116 may have a curved shape that may be supported by a parabolic curved surface in sliding contact.

According to examples, any of the apparatuses 100 depicted in FIGS. 1A-1E may include multiple stations, in which each of the multiple stations includes a respective set of magnets 102, masks 122, and radiation sources 120. In these examples, the stations may be arranged such that the substrate 116 may be moved through each of the stations sequentially. In addition, each of the stations may include a respective fluid applying mechanism to apply an additional layer of the fluid carrier 118. As such, for instance, a surface of the substrate 116 may be coated with a first fluid carrier 118 and the first fluid carrier 118 may be exposed to a magnetic field and radiation to orient the magnetically-orientable flakes in the first fluid carrier 118. After the first fluid carrier 118 has been cured, a second fluid carrier 118 may be applied onto the cured first fluid carrier 118. The second fluid carrier 118 may also be exposed to a magnetic field and radiation to orient the magnetically-orientable flakes in the second fluid carrier 118.

The magnetically-orientable flakes in the second fluid carrier 118 may be oriented in the same or in a different manner as the magnetically-orientable flakes in the first fluid carrier 118. That is, for instance, the magnetically-orientable flakes in the second fluid carrier 118 may have the same configuration as the magnetically-orientable flakes in the first fluid carrier 118 or magnetically-orientable flakes in the second fluid carrier 118 may have a different configuration than the magnetically-orientable flakes in the first fluid carrier 118. Moreover, an additional layer or layers of fluid carrier 118 may be applied and cured in additional stations. In one regard, the multiple stations may be implemented to fabricate an article to include multiple coatings of fluid carriers 118.

By way of example, the first fluid carrier 118 may be a clear or dyed ink or paint vehicle, mixed with reflecting or color-shifting of diffractive or any other platelet-like magnetic pigment of one concentration (e.g., between about 15-50 weight %). The first fluid carrier 118 may be printed/painted on the surface of the substrate 116 in any predetermined graphical pattern, exposed to the magnetic field to form a predetermined optical effect, and cured to fix the magnetically-orientable flakes in the layer of first fluid carrier 118 after solidification of the first fluid carrier 118. The second fluid carrier 118 may be of relatively lower concentration (e.g., in the range of between about 0.1-15 wt. %). The ink or paint vehicle for the second fluid carrier 118 may be clear or dyed. The magnetically-orientable flakes in the second fluid carrier 118 may be the same as for the first fluid carrier 118 or they may be different. The flake sizes for the second fluid carrier 118 may also be the same or different from the flake sizes for the first fluid carrier 118. Moreover, the color of the flakes for the second fluid carrier 118 may be the same or different from the color of the flakes for the first fluid carrier 118. The shape and/or intensity of the magnetic field applied to the second fluid carrier 118 may be the same or different from the shape and/or intensity of the magnetic field applied to the first fluid carrier 118. In addition or in other examples, the graphical pattern for the second fluid carrier 118 may be the same or different from the graphical pattern for the first fluid carrier 118. In any regard, a combination of inks or pigment colors may either enhance or depress a particular color in the image formed from the multiple layers of fluid carriers 118.

According to examples, through application and curing of multiple coatings of fluid carriers 118 on a substrate 116 as disclosed herein, an image may be formed of the magnetically-orientable flakes such that multiple distinct features within the image may appear to move simultaneously. In addition, the movement may be relative movement when the image is moved or when the light source upon the image is moved. In addition or in other examples, multiple distinct features within the image may appear to move, in which one is stationary while the other moves, and vice versa, when the image is moved in different directions or when the light source upon the image is moved in different directions. In particular examples, through application and curing of multiple coatings of fluid carriers 118 on a substrate 116 as disclosed herein, complex patterns of lines, points, arcs, and other shapes, enhanced with optically-illusive effects may be utilized in an article printing process to make it difficult for visually encrypted articles to be counterfeited.

Figure 2A:
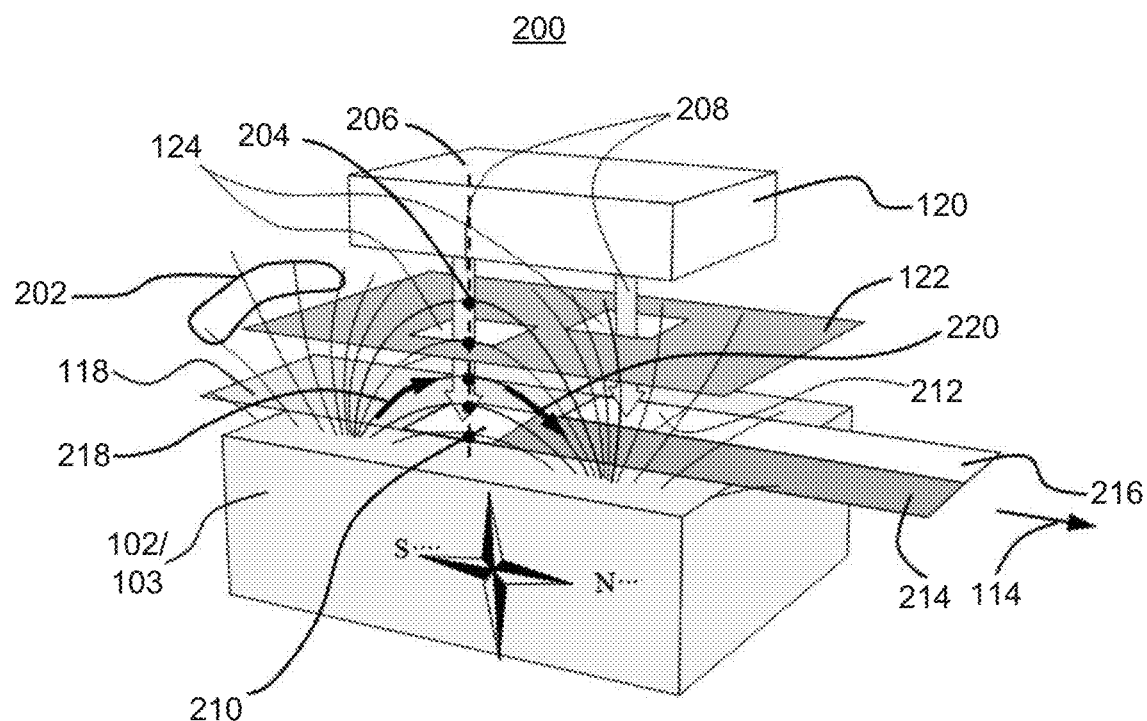
FIG. 2A shows a simplified isometric view of an apparatus for orienting magnetically-orientable flakes, according to an example of the present disclosure.

With reference now to FIG. 2A, there is shown a simplified isometric view of an apparatus 200 for orienting magnetically-orientable flakes according to another example of the present disclosure. The apparatus 200 depicted in FIG. 2A includes many of the same features as those described above with respect to FIGS. 1A and 1B and thus, those common features will not be described in detail with respect to FIG. 2A.

In FIG. 2A, a plurality of magnetic field lines 202 generated or applied by the magnet 102 and/or magnets 102/103 are shown. The box labeled 102/103 represents either or both of the magnets 102 and 103. FIG. 2A also shows that undulation points 204 on the curves of the magnetic field lines 202 are located along a line 206 that extends perpendicularly to the feed direction 114. The line 206 may be considered as an axis of reflection symmetry of the magnetic field lines 202. As shown, the substrate 116, with the fluid carrier 118, may be moved rectilinearly in the feed direction 114 such that the fluid carrier 118 moves over the magnet(s) 102/103 and through the magnetic field lines 202 of the magnetic field generated by the magnet(s) 102/103. In the example shown in FIG. 2A, the entire surface of the substrate 116 is depicted as being coated with the fluid carrier 118. However, it should be understood that smaller portions of the substrate 116 may be coated with the fluid carrier 118 without departing from a scope of the present disclosure.

The substrate 116 is depicted as being moved through the magnetic field in a direction from the south pole to the north pole of the magnet(s) 102/103. In other examples, however, the positions of the poles may be reversed. In any regard, as the substrate 116 is moved, the magnetically-orientable flakes in the fluid carrier 118 may become closely aligned with the direction of the magnetic field (along the magnetic field lines 202) to which the magnetically-orientable flakes are subjected. In addition, the orientations of the individual magnetically-orientable flakes may change as a function of time as the magnetically-orientable flakes move through and become aligned in the direction of different lines of the magnetic field lines 202. According to examples, the substrate 116 may be fed at a sufficiently slow rate to enable the magnetically-orientable flakes to become aligned with the direction of magnetic field lines 202 and to attain desired orientations with respect to the plane of the substrate (e.g., dihedral angles).

While the substrate 116 is being fed and the magnetically-orientable flakes have become closely aligned with the direction of some of the magnetic field lines 202, the radiation source 120 may direct radiation toward the fluid carrier 118. However, the mask 122 positioned between the radiation source 120 and the fluid carrier 118 may block the radiation from reaching the fluid carrier 118 except through the openings 124 formed in the mask 122. The mask 122 may be separated from the substrate 116 by a relatively short distance, for instance, a distance that is between about 0.05 mm to about 6.25 mm (about 0.002 inches to about 0.25 inches). In the example illustrated in FIGS. 2A and 2B, the mask 122 is shown as having two rectangular openings 124 through which radiation 208 from the radiation source 120 may be directed onto the regions 210 and 212 of the fluid carrier 118 located beneath the openings 124. In other examples, however, the mask 122 may include a fewer or a greater number of openings 124. As discussed in greater detail herein, the openings 124 may have different sizes and/or shapes and may be positioned at an edge of the mask 122.

The openings 124 are depicted as being formed at offset locations on the mask 122 with respect to the feed direction 114. In one regard, therefore, a different set of vector forces (shown schematically as magnetic field lines 202) may act upon the first region 210 as compared with the second region 212. The magnetically-orientable flakes contained in the first region 210 may thus become aligned along the direction of magnetic field lines 202 that penetrate the plane of substrate in the first region 210 thus resulting in the magnetically-orientable flakes achieving a first dihedral angle (e.g., the angle of the flake "out" the plane of the substrate). The first dihedral angle is different as compared to the magnetically-orientable flakes contained in the second region 212 that may become aligned along the direction of magnetic field lines 202 that penetrate the plane of the substrate 116 within the second region 212 and thus achieving a second dihedral angle. Thus, the magnetically-orientable flakes located in the first region 210 may have different orientations (e.g., dihedral angles with respect to a plane of the substrate 116) as compared with the magnetically-orientable flakes located in the second region 212. In addition, the magnetically-orientable flakes in the first and second regions 210 and 212 may at least be partially fixed through application of the radiation 208 onto the regions 210 and 212. That is, the application of the radiation 208 may cause the fluid carrier 118 in the regions 210 and 212 to at least partially solidify and the partial or total solidification of the fluid carrier 118 may cause the magnetically-orientable flakes in those regions 210 and 212 to become at least partially fixed in the dihedral angle (e.g., orientation of the flake "out" of the plane of the substrate) that the magnetically-orientable flakes have attained as caused by the vector forces (shown schematically as magnetic field lines 202) to which those magnetically-orientable flakes are subjected.

The portions of the fluid carrier 118 that have been at least partially solidified through receipt of the radiation 208 as the substrate 116 is fed in the feed direction 114 are depicted as regions 214 and 216. The first region 214 may contain magnetically-orientable flakes that have been aligned along the direction of a first set of magnetic field lines 202 and the second region 216 may contain magnetically-orientable flakes that have been aligned along the direction of a second set of magnetic field lines 202. According to examples, the openings 124 are positioned with respect to the magnet or magnets 102/103 such that the magnetically-orientable flakes are aligned along the direction of sections of magnetic field lines 202 having predetermined angles.

Figure 2B:
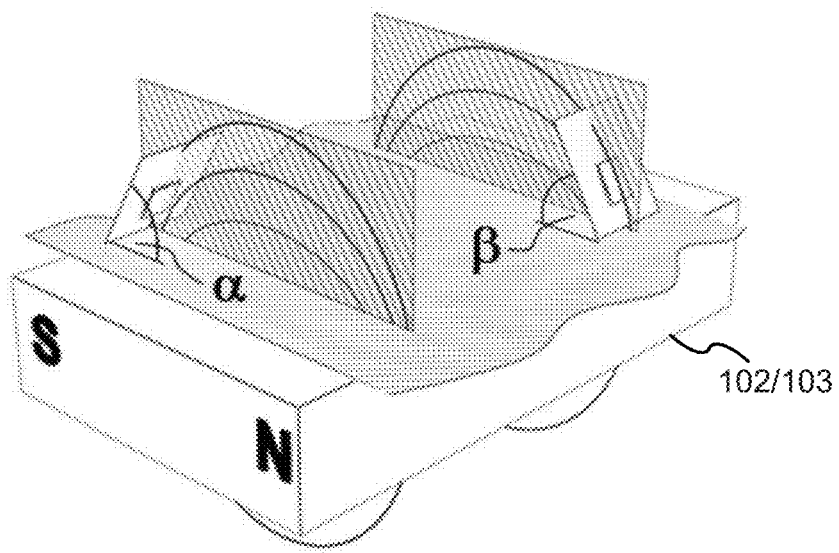
FIG. 2B shows a simplified isometric view of a magnet and its magnetic field, according to an example of the present disclosure.

In FIG. 2A, the substrate 116 is depicted as being moved rectilinearly along the north-south cardinal direction of the magnetic field applied by the magnet(s) 102/103 and along a surface that is physically located between the magnet(s) 102/103 and the radiation source 120. Each of the curved magnetic field lines 202 may be represented by two parts connected at an undulation point 204 of every curve and may have a convex curve shape. Each of the curved magnetic field lines 202 may incline at an average angle $\alpha$ from the surface(s) of the magnet(s) 102/103 (as shown in FIG. 2B) to one of the corresponding undulating points 204 as illustrated with the corresponding black arrow 218. The tangent of the magnetic field lines at undulation point 204 coincides with the feed direction 114 of the substrate 116. In addition, the curved magnetic field lines decline at an average angle $\beta$ from the corresponding undulation point 204 to the surface(s) of the magnet(s) 102/103 (as shown in FIG. 2B) in the direction of the black arrow 220 in the right portions of the magnetic field lines 202. FIG. 2B illustrates a simplified view of an exemplary magnet 102/103 and the magnetic fields the magnet 102/103 produces.

Figure 2C:
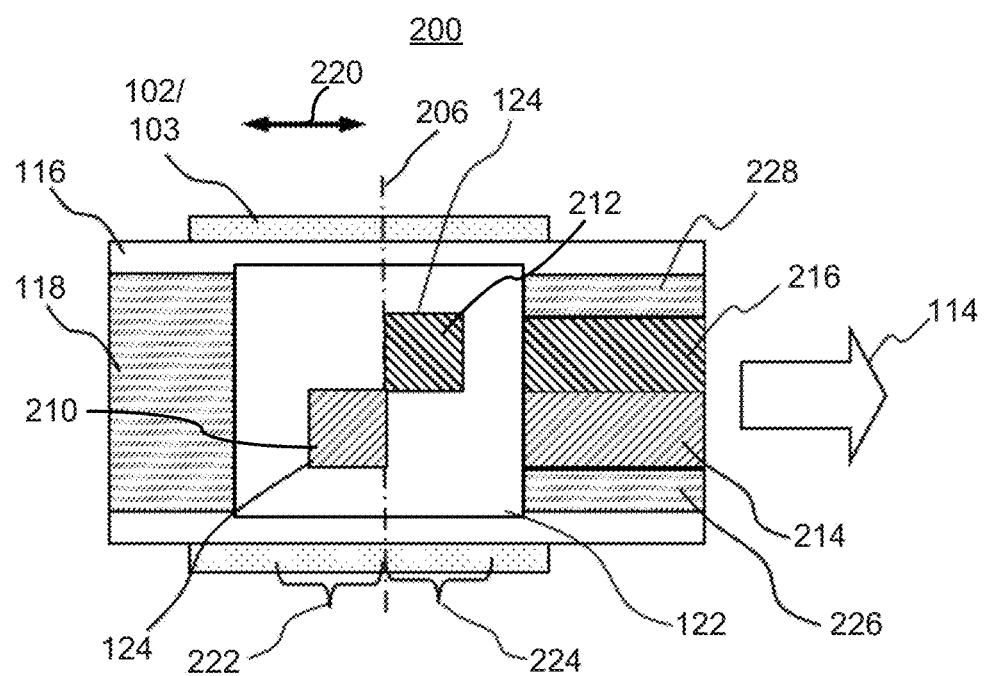
FIG. 2C shows a simplified top view of an apparatus for orienting magnetically-orientable flakes, according to another example of the present disclosure.

Turning now to FIG. 2C, there is shown a simplified top view of an apparatus 200 for orienting magnetically-orientable flakes according to another example of the present disclosure. The apparatus 200 depicted in FIG. 2C includes many of the same features as those described above with respect to FIG. 2A and thus, those common features will not be described in detail with respect to FIG. 2C. The radiation source 120 has been omitted from FIG. 2C such that the mask 122 and the openings 124 may more readily be visible.

As shown in FIG. 2C, the substrate 116 may be fed in the feed direction 114 over a magnet(s) 102/103 such that the fluid carrier 118 may be moved through a magnetic field applied along the north-south cardinal direction of the magnetic field as represented by the arrow 220. The undulation points 204 (FIG. 2A) of the applied magnetic field may be centered along the line 206, which may denote an axis of reflectional symmetry of the magnetic field lines 202 (FIG. 2A). The openings 124 in the mask 122 are depicted as being positioned on opposite sides of the line 206 and in rotational symmetry with respect to a point that is adjacent to both of the openings 124.

As such, the first region 210 of the fluid carrier 118 beneath the first opening 124 is within an inclining portion 222 of the curved magnetic field lines 202 and the second region 212 of the fluid carrier 118 beneath the second opening 124 is within a declining portion 224 of the curved magnetic field lines 202. In this regard, the magnetically-orientable flakes located in the first region 210 may have different orientations than the magnetically-orientable flakes located in the second region 212. For instance, the magnetically-orientable flakes located in the first region 210 may have a dihedral angle $\alpha$ with respect to the major plane of the substrate 116 that is in the range of about $0°<\alpha<90°$. In addition, the magnetically-orientable flakes located in the second region 212 may have a dihedral angle $\beta$ with respect to the major plane of the substrate 116 that is also in the range of about $0°<\beta<90°$. It should be noted in the example of FIG. 2C that the dihedral angle $\alpha$ is taken in the feed direction 114 whereas the dihedral angle $\beta$ is taken in the direction opposite to the feed direction 114. Therefore the angle represented by the dihedral angle $\beta$ may alternatively be thought of as angle $\alpha$ when the angle taken along the feed direction is in the range of about $90°<\text{angle}<180°$.

The radiation source 120 may apply radiation 208 (FIG. 2A) through the opening 124 in the mask 122, in which the applied radiation 208 may cause the fluid carrier 118 to at least begin to solidify, which may result in the magnetically-orientable flakes upon which the radiation 208 is applied to at least partially begin to be fixed in various orientations with respect to the major plane of the substrate 116. In addition, as the substrate 116 may continuously be fed in the feed direction 114 as solidification of portions of the fluid carrier 118 is at least begun, the magnetically-orientable flakes in different portions of the fluid carrier 118 may have different orientations as denoted by the regions 214 and 216. Moreover, as the mask 122 may be positioned at a relatively short distance away from the substrate 116, the widths of the regions 214 and 216 may closely coincide with the widths of the openings 124. However, because radiation 208 may be applied as the substrate 116 is moved in the feed direction 114, the lengths of the regions 214 and 216 may be much longer than the lengths of the openings 124 and may depend upon the length of the substrate 116, lengths of individual sections of the fluid carrier 118, etc.

As also shown in FIG. 2C, the magnetically-orientable flakes located in the portions of the fluid carrier 118 that do not receive radiation 208 from the radiation source 120 may either return to the orientations that the magnetically orientable flakes had prior to being introduced to the magnetic field or may have orientations that may align with the directions of the last sets of magnetic field lines that were applied to those magnetically orientable flakes. The regions 226 and 228 of the fluid carrier 118 that did not receive radiation 208 through the openings 124 are also depicted in FIG. 2C. As may be seen in that figure, the orientations of the magnetically orientable flakes contained in the regions 226 and 228 may differ from the orientations of the magnetically orientable flakes contained in the regions 214 and 216. In addition, the fluid carrier 118 contained in the regions 226 and 228 may not have been solidified and may thus require the application of additional energy to solidify those regions 226 and 228.

In another example, the undulation points 204 (FIG. 2A) of the applied magnetic field are centered along the line 206—which may denote an axis of reflectional symmetry of the magnetic field lines 202 (FIG. 2A)—but the openings 124 in the mask 122 are not positioned on opposite sides of the line 206 but instead are both positioned to be closer to one pole of the magnet than they are to the opposite pole. This positioning of the openings 124 in the mask 122 may result in magnetically-orientable flakes achieving orientations (and dihedral angles with respect to the plane of the substrate) that are different from the example of FIG. 2C. This is due to the fact that the direction of magnetic field lines 202 that penetrate the plane of substrate in the first region 210 and second region 212 of this example are different from the direction of magnetic field lines 202 that penetrate the plane of the substrate in the first region 210 and second region 212 of the example of FIG. 2C.

In another example, unlike the example shown in FIG. 2C, the openings 124 may not contact line 206 (e.g., may be separated from contact line 206 in the feed direction and/or opposite the feed direction). This positioning may result in magnetically-orientable flakes with a smaller dihedral angle α and a dihedral angle β (e.g., closer to parallel with the plane of the substrate). In another example, unlike the example shown in FIG. 2A, the closest edges of a first opening 124 to a second opening 124 may not be continuous, but rather, may be separated by a distance in the feed direction 114. This positioning may result in a greater difference between dihedral angle α and the complimentary angle to dihedral angle β (e.g., 180 degrees minus dihedral angle β).

With reference now to FIG. 3A, there is shown a simplified isometric view 300 of the magnetically-orientable flakes located in the regions 214 and 216 of the fluid carrier 118 depicted in FIG. 2B. As shown, a first set of magnetically-orientable flakes 302 located in the first region 214 may be oriented at a dihedral angle α with respect to the major plane of the substrate 116 taken in the feed direction 114. In addition, a second set of magnetically-orientable flakes 304 located in the second region 216 may be oriented at a dihedral angle β with respect to the major plane of the substrate 116 taken in the direction opposite to the feed direction 114. As the magnetically-orientable flakes 302 and 304 may become oriented as the substrate 116 is continuously moved in the feed direction 114, the first set of magnetically-orientable flakes 302 may have the same or similar orientations and dihedral angles as other flakes within the first set of magnetically-orientable flakes 302. Likewise, the second set of magnetically-orientable flakes 304 may have the same or similar orientations and dihedral angles as other magnetically-orientable flakes 304 within the second set of magnetically-orientable flakes 302.

When the substrate 116 is positioned as shown in FIG. 3C, and the upper right corner is rotated forth or back about a horizontal axis 306 as shown in FIG. 3C, light may be reflected from the first set of magnetically-orientable flakes 302 differently from the second set of magnetically-orientable flakes 304 depending on the position of the viewer and the light. The differences in the reflectance of the flakes 302 and 304 are illustrated in comparison between FIGS. 3B and 3C. FIG. 3B shows a top (near-normal) view 310 of the arrangement shown in FIG. 3A and FIG. 3C shows a tilted view 320 of the arrangement shown in FIG. 3A. FIG. 3B thus shows the effect of light reflecting from both the first set of magnetically-orientable flakes 302 and the second set of magnetically-orientable flakes 304. In FIG. 3B, the second set of magnetically-orientable flakes 304 is depicted as reflecting light back to an observer, e.g., is bright (may appear silver if the magnetically-orientable flakes are achromatic) and the first set of magnetically-orientable flakes 302 is depicted as not reflecting light back to the observer, e.g., is dark (may appear black if the magnetically-orientable flakes are achromatic). FIG. 3C shows the arrangement being tilted about a horizontal axis 306 such that a top part of the arrangement is tilted away from the observer. In FIG. 3C, tilting of the arrangement causes the first set of magnetically-orientable flakes 302 to reflect light back to the observer, e.g., is bright (may appear silver if the magnetically-orientable flakes are achromatic) and the second set of magnetically-orientable flakes 304 is depicted as not reflecting light back to the observer, e.g., is dark. In other examples in which the magnetically-orientable flakes belong to the family of interference color-shifting pigments, the reflected hues observed of the sets of magnetically-orientable flakes 302, 304 may correspond to color characteristics of the pigment at the angles at which the magnetically-orientable flakes are tilted in the fluid carrier 118 with reflect to the light. For example, at a first angle of observance, the first set of magnetically-orientable flakes 302 may reflect light back to the observer in the blue spectrum range and the second set of magnetically-orientable flakes 304 may reflect light back to the observer in the green spectrum range of wavelengths. At a second angle of observance, the first set of magnetically-orientable flakes 302 may reflect light back to the observer in the green spectrum range and the second set of magnetically-orientable flakes 304 may reflect light back to the observer in the blue spectrum range of wavelengths.

Figure 3D:
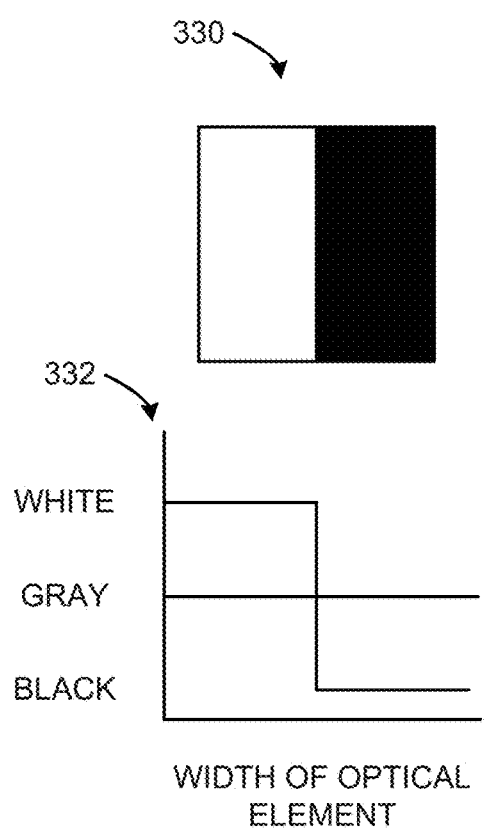
Figure 3E:
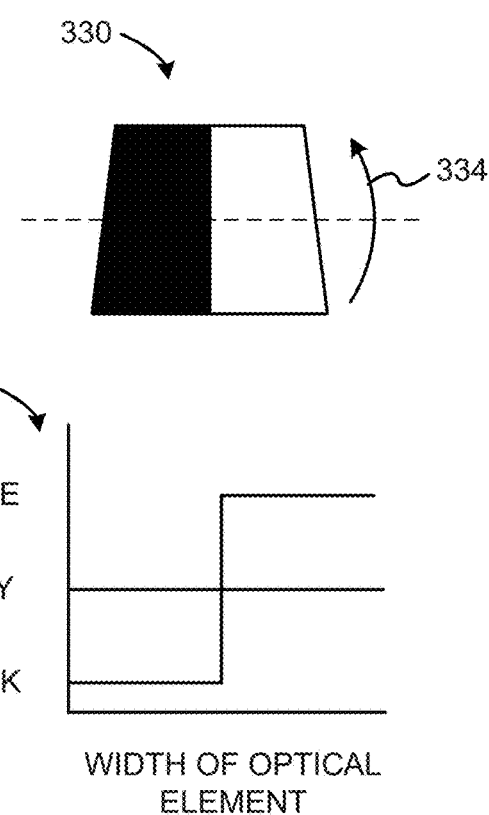

The shifting optical effects of the magnetically-orientable flakes 302, 304 are further shown and described with respect to FIGS. 3D and 3E. FIGS. 3D and 3E, respectively, show an example of an optical element 330 in various tilting states. The optical element 330 may be an optical security device, which may be provided on a banknote, stock certificate, or the like. FIG. 3D depicts the optical characteristics of the optical element 330 when the optical element 330 is viewed at a first angle, e.g., from a direction normal to the optical element 330. The graph 332 shows that the left side of the optical element 330 appears white (e.g., bright) and the right side of the optical element 330 appears black (e.g., dark). FIG. 3E depicts the optical characteristics of the optical element 330 when the optical element 330 is tilted away from an observer as noted by the arrow 334. The graph 336 shows that the left side of the optical element 330 appears black (e.g., dark) and the right side of the optical element 330 appears white (e.g., bright). As shown in FIGS. 3D and 3E, the magnetically-orientable flakes are oriented such that tilting of the optical element 330 in one direction (e.g., top to bottom) results in an optical shift in the opposite direction (e.g., left to right).

Although the optical element 330 has been depicted as having a square shape and two opposing sides, it should be understood that the optical element 330 may have any shape and any number of sides. Examples in which the optical element 330 includes additional sides are described in greater detail hereinbelow.

Although particular reference has been made above to the mask 122 as having a pair of openings 124 positioned as shown in FIGS. 2A-2C, it should be understood that masks having other opening 124 (or equivalently cutout) configurations may be implemented in the apparatuses 100, 200. The other opening 124 configurations may result in sets of magnetically-orientable flakes having different orientations with respect to each other than the orientations depicted in FIGS. 3A-3C. Examples of masks 400-430 having other opening configurations that may be implemented in the apparatuses 100, 200 are depicted in FIGS. 4A-4F.

Figure 4A:
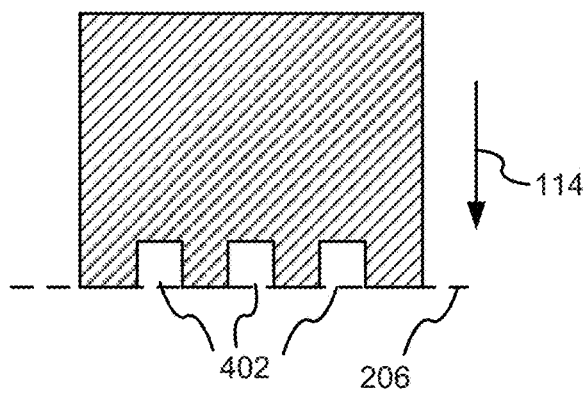
FIGS. 4A-4F, respectively, show examples of masks that may be implemented in the apparatuses depicted in any of FIGS. 1A-2B, according to an example of the present disclosure.
Figure 4B:
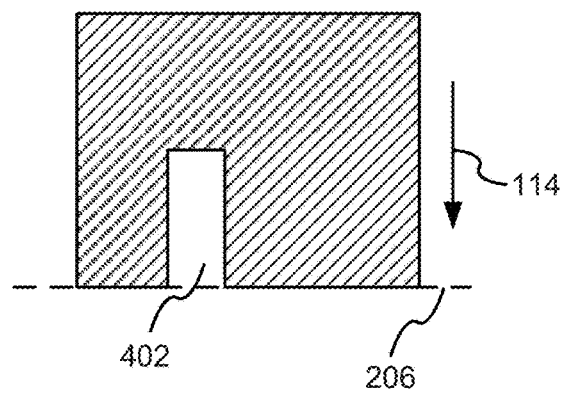

By way of example, the mask 400 depicted in FIG. 4A is shown as having a plurality of openings 402 formed along an edge of the mask 400. The edge of the mask 400 at which the openings 402 are formed may be the edge of the mask 400 that is to be positioned to abut a line 206 that represents the axis of reflectional symmetry of the magnetic field lines 202 (FIGS. 2A-2C) along the feed direction 114 of the substrate 116. The mask 410 depicted in FIG. 4B is shown as having an opening 402 that is elongated along the feed direction 114 and in which the opening 402 is formed at an edge of the mask 410 that is positioned to abut the line 206 that represents the axis of reflectional symmetry of the magnetic field lines 202.

Figure 4C:
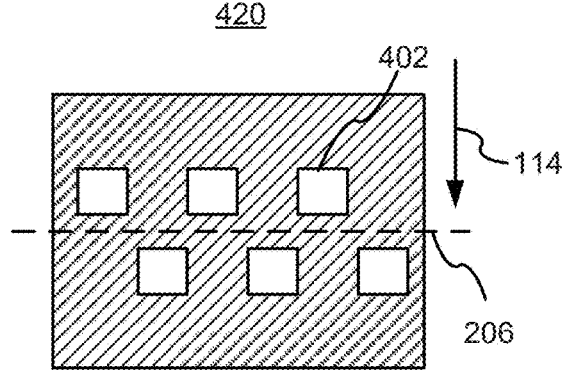
Figure 4D:
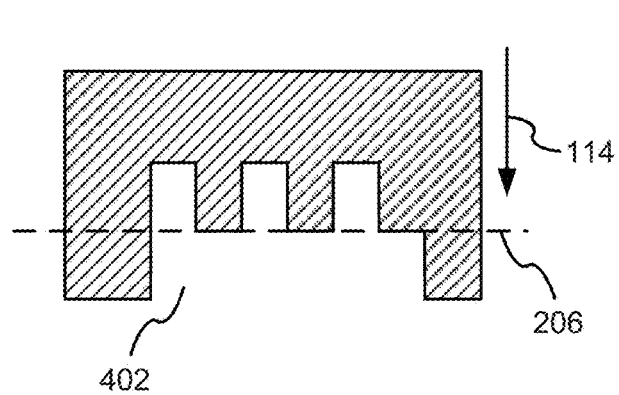

The mask 420 depicted in FIG. 4C is shown as having a plurality of openings 402 positioned on opposite sides of the line 206 that represents the axis of reflectional symmetry of the magnetic field lines 202 with respect to the feed direction 114. Adjacent ones of the plurality of openings 402 are also depicted as being offset with respect to each other along the direction that is perpendicular to the feed direction 114. The mask 430 depicted in FIG. 4D is shown as having a plurality of openings 402 on one side of the line 206 that represents the axis of reflectional symmetry of the vector forces 202 and a larger opening 402 on the opposite side of the line 206. In addition, the larger opening 402 is depicted as extending beyond the rightmost smaller opening 402 along the direction perpendicular to the feed direction 114.

In still another example, the plurality of openings 402 may alternatively be positioned on the same side of the line 206 as opposed to some being positioned on one side, and the remainder positioned on the opposite side of the line 206. For example, each of the openings 402 may be positioned in the feed direction 114 of line 206. Alternatively, each of openings 402 may be positioned opposite the feed direction 114 of line 206.

A mask 122 may provide a radiation footprint from the radiation source 120 on the deposited fluid carrier. For a radiation source illuminating a mask 122, the opening 124 in the mask 122 defines the radiation footprint whereby radiation from the radiation source 120 is emitted onto the substrate. In some examples, curing begins as the substrate 116 moves deposited ink into the radiation footprint. The mask 122, and for that matter, the radiation footprint defined by the mask 122 and the radiation source 120, may be viewed as having a leading edge. The leading edge may be defined as the locus of positions where the radiation is first emitted on the fluid carrier 118.

Figure 4E:
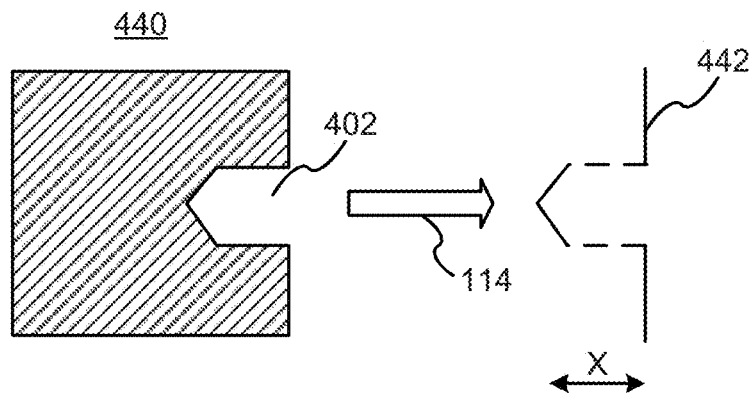
Figure 4F:
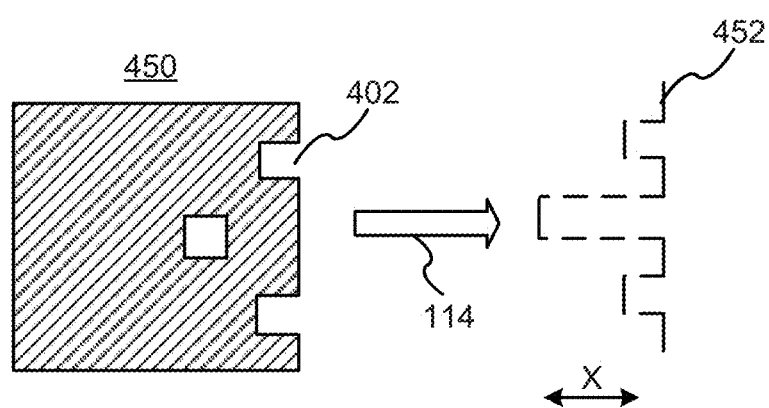

FIGS. 4E and 4F provide two examples in which a mask defines a leading edge of a radiation footprint. For the mask 440, the leading edge 442 is illustrated to the right of mask 440. The extent of the leading edge 442 in the feed direction 114 is indicated by the variable x. The mask 450 illustrates another example, in which the extent of the leading edge 452 in the direction of feed direction 114 is again represented by the variable x. As seen in FIGS. 4E and 4F, a leading edge may be discontinuous. In other examples, the leading edge (e.g., the leading edge of the mask in FIG. 6A) may include a continuous portion that has an extent along feed direction 114. The value of the extent of a leading edge may be between 0.5 mm and 30 mm, or 1 mm to 20 mm. In some examples, the extent may be less than 2 mm or less than 1 mm. In other examples, the extent may be greater than 10 mm or greater than 20 mm.

Figure 4G:
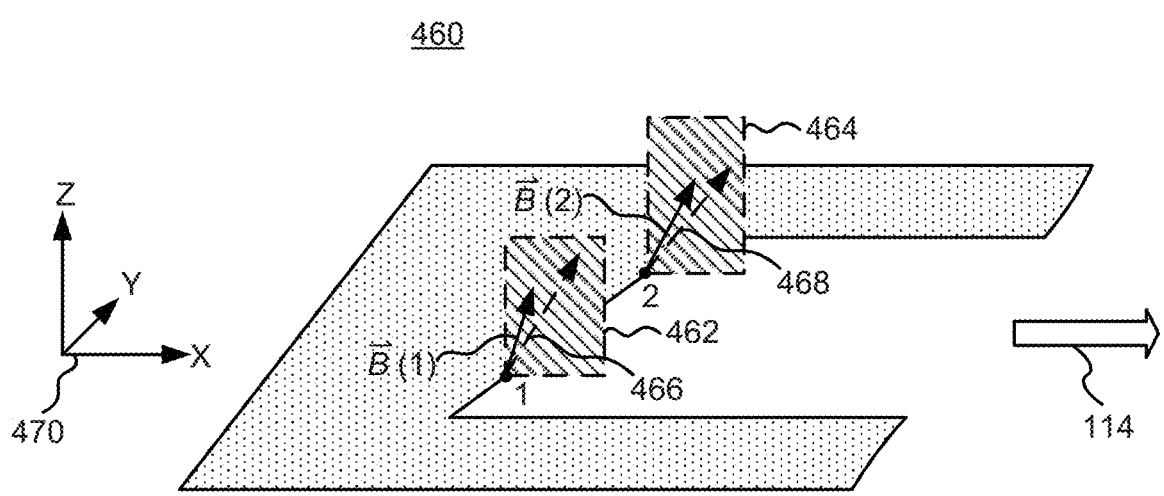
FIG. 4G illustrates an orthogonal projection of an external magnetic induction onto a plane, in which the plane is normal to the substrate and contains a velocity vector of the substrate, according to an example of the present disclosure.

In the some examples, the external magnetic induction varies in direction along all or at least a portion of a leading edge. FIG. 4G illustrates the relative variation in direction of the external magnetic induction at two points labeled 1 and 2 in a leading edge of the mask 460, where $\vec{B}(1)$ and $\vec{B}(2)$ denote, respectively, the external magnetic induction at positions 1 and 2. The feed direction is represented by the arrow 114. The planes 462 and 464 are normal to the substrate 116 and contain the substrate velocity vector. The orthogonal projection of the external magnetic induction $\vec{B}(1)$ onto the plane 462 is indicated by the vector labeled 466, and the orthogonal projection of the external magnetic induction $\vec{B}(2)$ onto the plane 464 is indicated by the vector labeled 468. The relative direction of the orthogonal projection of the external magnetic induction varies among the positions 1 and 2. For some embodiments, this variation in direction may only be on the order of a few degrees or less, but may be greater for other embodiments. For the particular example of FIG. 4G, the polar angle of the orthogonal projection of the external magnetic induction at position 2 is larger than that at position 1, where the polar angle is taken with respect to the normal to the plane of the substrate 116.

Note that with respect to an orthogonal projection, the planes 462 and 464 are equivalent. That is the planes 462 and 464 may belong to an equivalence class for the purpose of defining an orthogonal projection. Accordingly, when describing an orthogonal projection, only one plane normal to the substrate and containing the substrate velocity vector may need to be considered. The coordinate system 470 may be useful when describing the orthogonal projection. The x-axis and y-axis for the coordinate system 470 lie in the plane of the substrate for those cases in which the substrate is planar in the vicinity of the leading edge of the mask 460, or equivalently, the x-y plane lies in the plane of the magnetic ink (alternately referred to as magnetically-orientable flake dispersed in a fluid carrier) or radiation footprint, where the x-axis is parallel to the direction of substrate motion. The z-axis is normal to the plane of the substrate (or magnetic ink or radiation footprint).

The planes 462 and 464 are parallel to the x-z plane of the coordinate system 470, and when considering orthogonal projections, the x-z plane and the planes 464 and 466 belong to the same equivalence class because orthogonal projections of a vector onto these planes yield the same results. The planes 462 and 464 are translations of the x-z plane in the direction of the y-axis.

In instances in which the substrate is curved about a roller, the coordinate system 470 may be generalized to a coordinate system in which the y-axis is parallel to and/or coincident with the roller axis. The x-axis may be directed along a substrate velocity vector, but this is not necessary because rotating the z-axis of the coordinate system 470 about the y-axis to yield a rotated coordinate system does not change the orthogonal projection. That is, the orthogonal projection of a vector onto the x-z plane yields the same result as an orthogonal projection of the vector onto the x-z' plane for a rotated coordinate system where the rotation is about the y-axis. Accordingly, when describing the orthogonal projection of the external magnetic induction onto a plane, the plane may be taken as normal to the substrate and containing the substrate velocity vector, or for the case in which the substrate is curved about a roller, the plane may be taken as normal to the axis of the roller.

For the case in which the substrate is curved about a roller, it is also sufficient to describe a plane for orthogonal projections as a plane normal to the substrate and containing a velocity vector of the substrate. Here, "normal" at a position (set of coordinates) where the substrate is wrapped around a roller refers to the local normal at that position, which may be taken as a vector containing that position and normal to the roller axis. Regarding the velocity vector, although the velocity vector of the substrate at some position when wrapped around a roller is not constant in direction, but is a function of position, it nevertheless lies in a plane normal to the axis of the roller. Planes normal to the roller axis are an equivalence class for the purpose of orthogonal projections, so that the orthogonal projection of the external magnetic induction onto a plane normal to the substrate and containing a velocity vector of the substrate may also be taken as the orthogonal projection onto a plane normal to the roller axis.

Accordingly, whether that part of the substrate subject to the radiation footprint is planar or wrapped about a roller, for the purpose of describing the orthogonal projection of the external magnetic induction along the leading edge of the radiation footprint, it is sufficient to take the orthogonal projection onto a plane normal to the substrate and containing a velocity vector of the substrate.

Figure 4H:
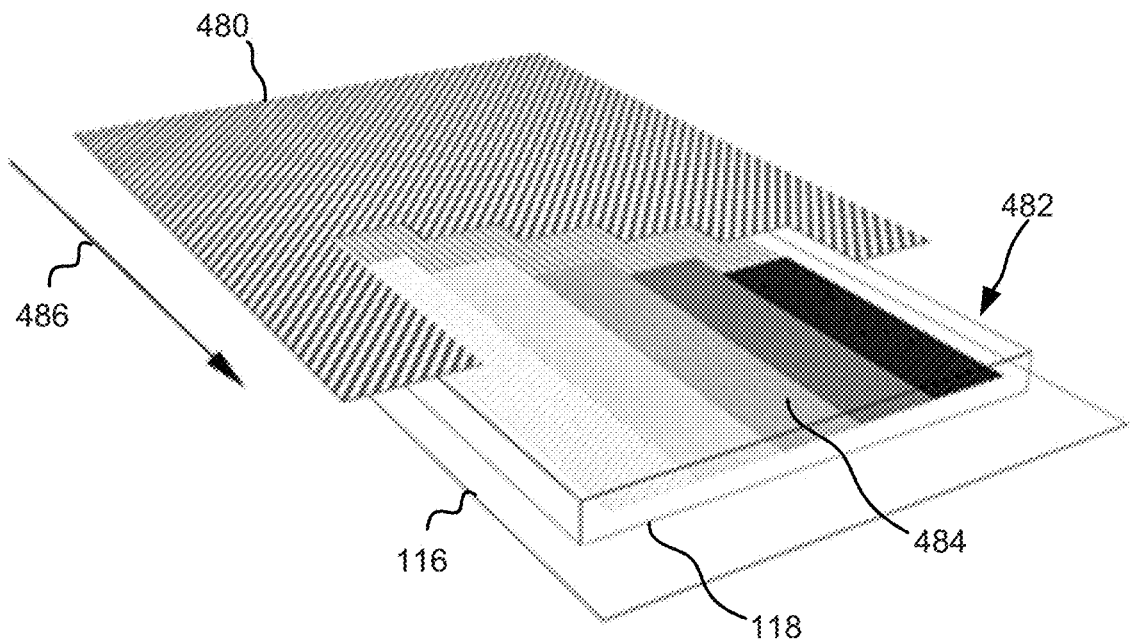
FIGS. 4H-4Q, respectively, show masks, security elements, and articles of value, according to examples of the present disclosure.
Figure 4I:
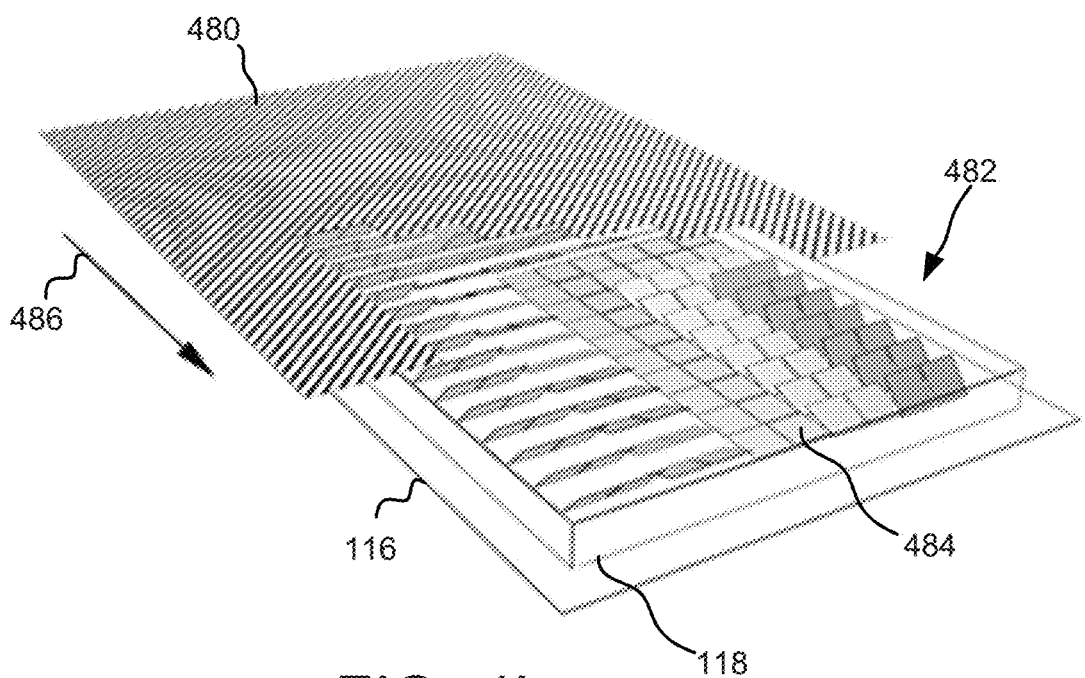

Turning now to FIGS. 4H and 4I, there are respectively shown perspective views of a mask 480 and an article 482 that may be implemented to orient magnetically-orientable flakes such that the oriented magnetically-orientable flakes may cause an ortho-parallactic motion of a synthetic image across the substrate 482 as the substrate 482 is rotated about an axis. An ortho-parallactic motion or effect may be described whereby tilting the upper edge of the article 482 away from or towards an observer, he or she may perceive a bright shape of reflected light moving from left to right or right to left. As another example, by tilting the left edge away from or towards an observer, he or she may perceive a bright shape of reflected light moving from top to bottom or bottom to top. In some examples, if and how the effect is perceived may depend upon how the magnetically-orientable flakes are placed on or within the article 482, whether the upper edge is tilted away from or towards the observer, and/or the position, strength, and/or distance of the light source. Alternatively, an ortho-parallactic optical motion or effect may be described whereby there exists an axis of rotation (the axis lying in the article) such that an observer rotating the article about the axis, depending on the light source, observes a reflective shape or image moving along the axis of rotation. An ortho-parallactic optical motion or effect may further be described as an optical effect in which an optical feature such as a shape that appears brighter or darker than other sections of the article appears to move across the article in a direction that is orthogonal to the tilting direction of the article. Thus, for instance, when the article is tilted about a horizontal axis, the optical feature may appear to move in a longitudinal direction.

Figure 4J:
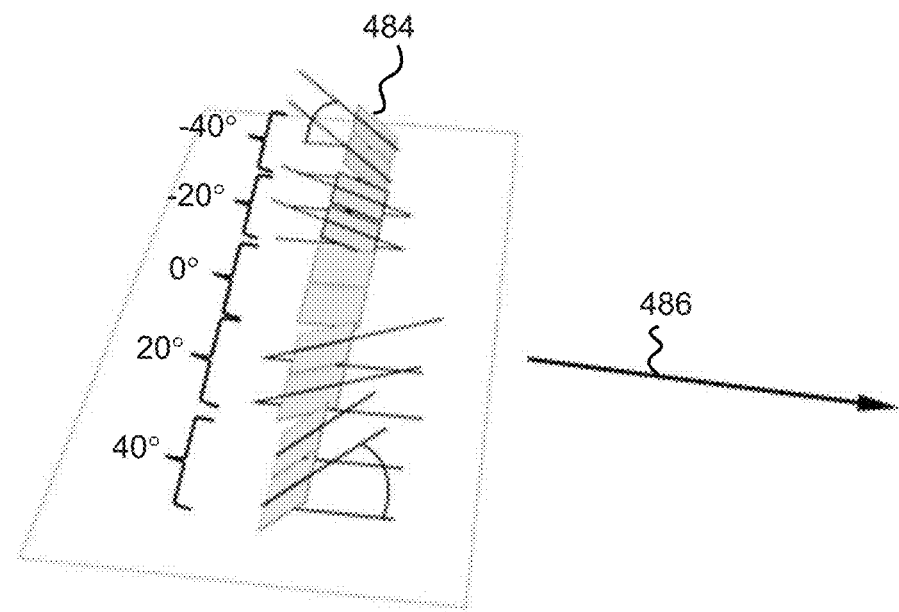

As shown in FIG. 4H, the article 482 may include a substrate 116 and a fluid carrier 118, both of which are described above. In addition, the mask 480 may include a stepped configuration such that as the article 482 is moved in the direction denoted by the arrow 486, the magnetically-orientable flakes 484 in different locations across the width of the article 482 may be locked into multiple rotational positions with respect to each other. The rotational positions of the magnetically-orientable flakes 484 are depicted as having different shadings in FIG. 4H and are depicted as having different angles of rotation in FIG. 4I. As discussed above, the magnetically-orientable flakes 484 may be rotated into the angles depicted in FIG. 4I through application of a magnetic field onto the magnetically-orientable flakes 484 and through application of radiation to at least partially solidify the fluid carrier 118 in a configuration consistent with the mask 480. In addition, FIG. 4J depicts an example in which the magnetically-orientable flakes 484 are oriented at angles that range between −40° and 40°.

The optical effect of the article 482 may be a bright band that moves sideways when the article 482 is tilted forth and back with respect to a light source. The kinematic light (or bright) band may be made to be more attractive or appealing by creating the article 482 to generate a synthetic kinematic image, which moves transversely within the margins of the article 482 with respect to the direction in which the article 482 is moved. By way of example, the synthetic kinematic image may be a contour of an object, a symbol, a numeral, a letter, combinations thereof, etc.

Figure 4K:
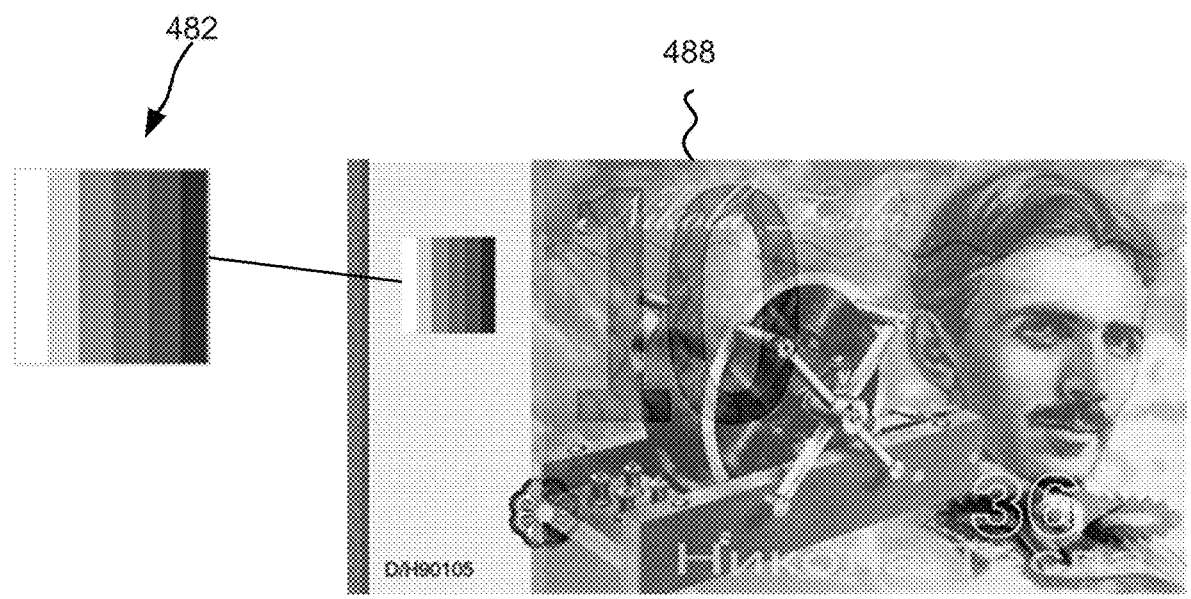

The article 482 may be provided on an article of value 488 as shown in FIG. 4K as a security element. The article of value 488 is depicted as a banknote and the article 482 has been depicted as a rectangular-shaped security element 702. It should be noted that the article or security element 482 is merely exemplary and is not limited to rectangular-shaped or use with bank notes or as a security element. For example, the security element 482 may be used on any article, including but not limited to, labels, packaging, advertisements, etc., and may have any shape. The different shades depicted in the security element 482 may represent light being reflected at different angles and thus, depending upon the tilt angle of the article of value 488, a different section of the security element 482 may be viewed as a synthetic image. In addition, through rotation of the article of value 488, the synthetic image may be viewed as a synthetic kinematic image as the synthetic image may appear to move.

Figure 4L:
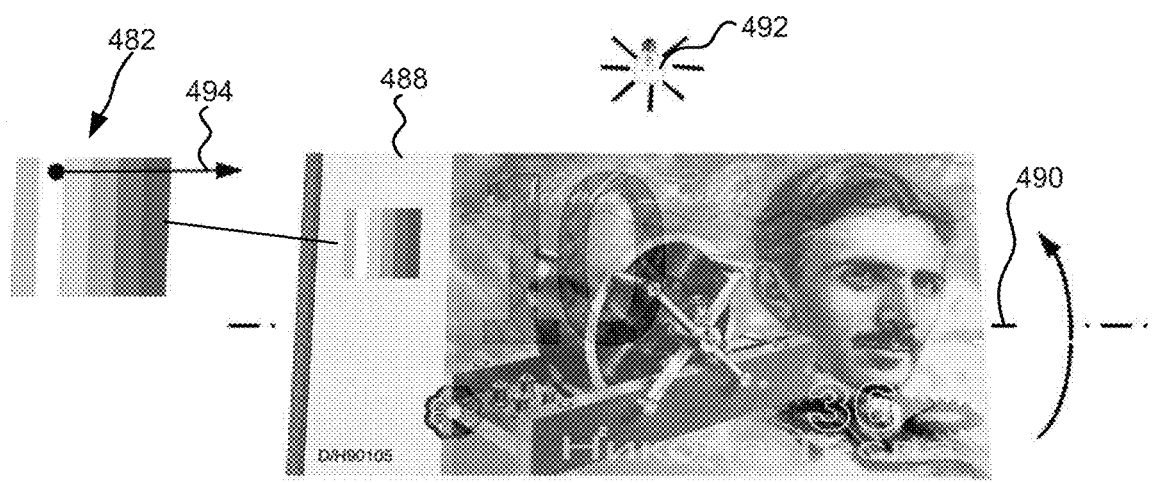
Figure 4M:
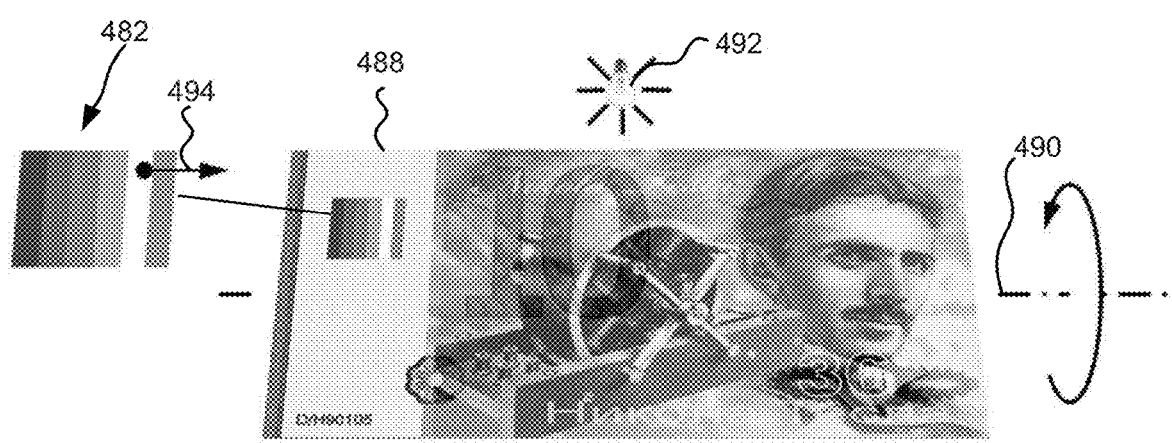

The synthetic kinematic image is further described with respect to FIGS. 4L and 4M, which depict the article of value 488 at various tilt angles with respect to an axis 490. As shown in those figures, the section of the security feature 482 that a viewer sees as a synthetic image as light from a light source 492 is reflected from the security feature 482 may move as indicated by the lighter or brighter band and the arrow 494. According to examples, the magnetically-orientable flakes in the security feature 482 may include various colors and/or color-shifting pigment such that the color of the synthetic image may vary as the article of value 488 is tilted, e.g., the magnetically-orientable flakes may have a gold-to-green pigment.

Figure 4N:
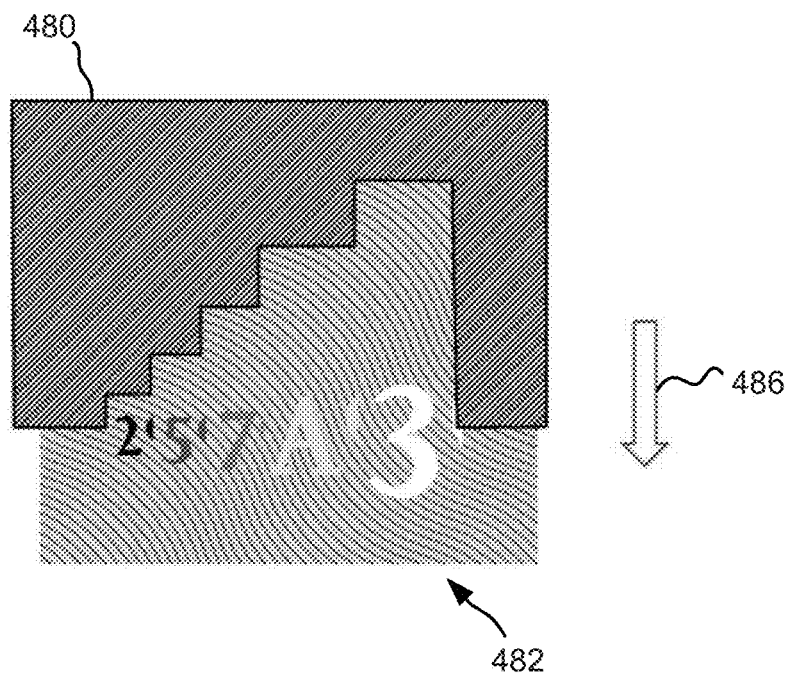
Figure 4O:
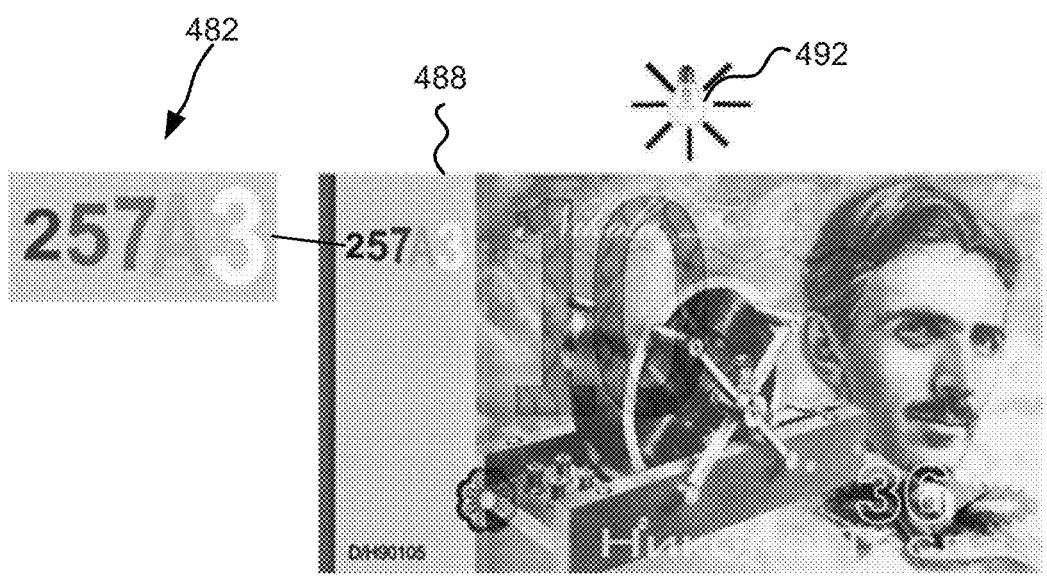

Turning now to FIG. 4N, there is shown an example of the mask 480 in which openings or cutouts in the mask 480 have different widths. The uneven widths of the steps in the mask 480 may result in a zooming effect, in which the portions of the article 482 that are located underneath the steps having the larger widths have a larger appearance as compared to the portions of the article 482 that are located underneath the steps having the smaller widths. In the example shown in FIG. 4N, the characters "2", "5", "7", "A", and "3" may be printed onto the substrate 116 with the fluid carrier 118. That is, a Guilloche or other graphic art may be provided on the substrate 116 and the fluid carrier 118, which may be a magnetic ink, may be applied or printed into the characters shown in FIG. 4N. The article 482 may be provided as a security element on an article of value 488 as shown in FIG. 4O. As shown in that figure, under a normal viewing angle, the numeral "3" may appear the brightest or may otherwise be the most prominent synthetic image.

Figure 4P:
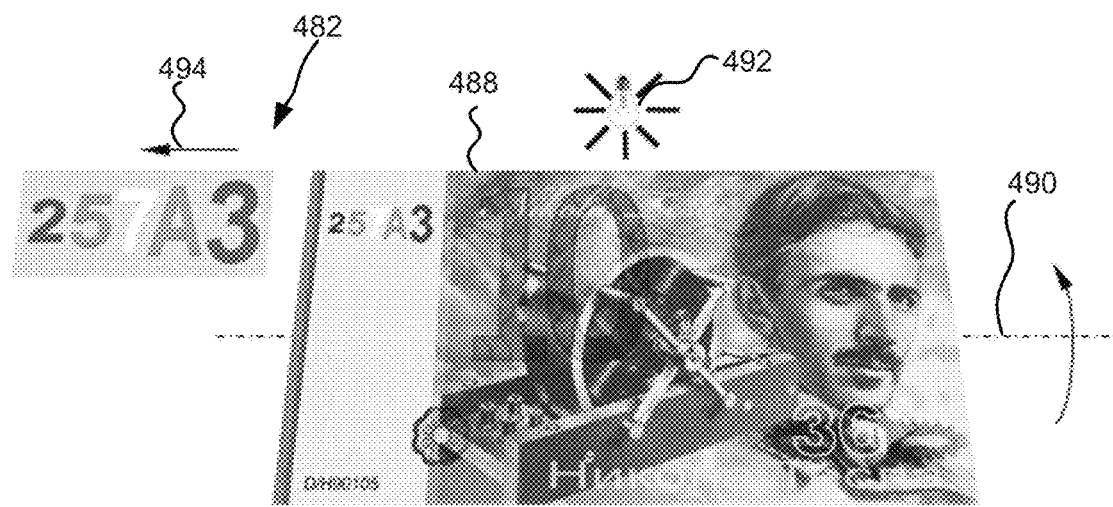
Figure 4Q:
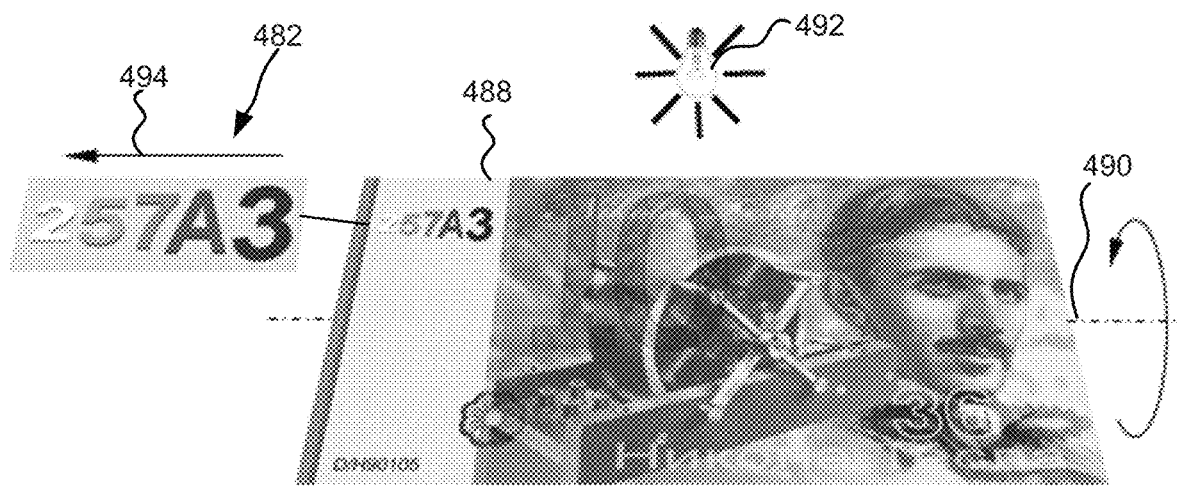

The synthetic kinematic image generated by the security element 482 is further described with respect to FIGS. 4P and 4Q, which depict the article of value 488 at various tilt angles with respect to an axis 490. As shown in those figures, the section of the security feature 482 that a viewer sees as a synthetic image as light from a light source 492 is reflected from the security feature 482 may move as indicated by the lighter or brighter band and the arrow 494. Thus, for instance, in FIG. 4P, the numeral "7" may have the most prominent appearance among the characters in the security element 482. Additionally, as the article of value 488 is tilted further as shown in FIG. 4Q, the numeral "2" may have the most prominent appearance among the characters in the security element 482. According to examples, the magnetically-orientable flakes in the security feature 482 may include various colors and/or color-shifting pigment such that the color of the synthetic image may vary as the article of value 488 is tilted, e.g., the magnetically-orientable flakes may have a gold-to-green pigment.

Figure 5A:
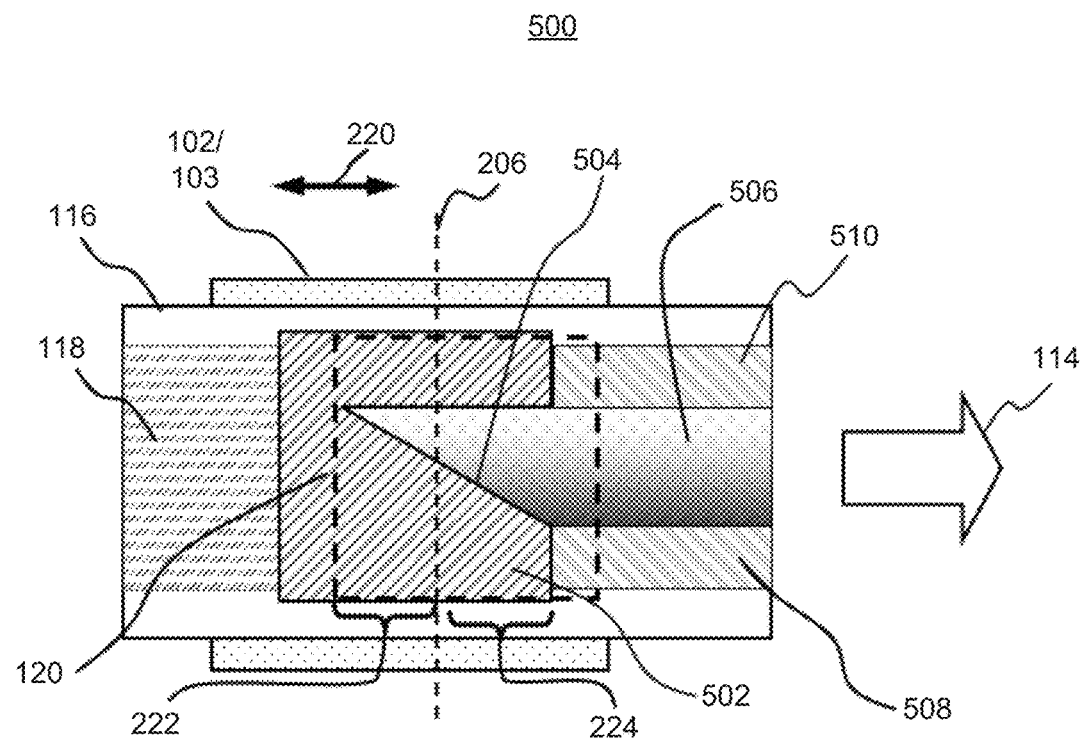
FIG. 5A shows a simplified top view of an apparatus for orienting magnetically-orientable flakes, according to another example of the present disclosure.

Turning now to FIG. 5A, there is shown a top view of an apparatus 500 for orienting magnetically-orientable flakes according to another example of the present disclosure. The apparatus 500 depicted in FIG. 5A includes many of the same features as those described above with respect to FIG. 2B and thus, those common features will not be described in detail with respect to FIG. 5A. However, the apparatus 500 depicted in FIG. 5A differs from the apparatus 200 depicted in FIG. 2B in that the mask 502 in the apparatus 500 has a wedge-shaped opening 504. As the wedge-shaped opening 504 will result in the application of energy from the radiation source 120 on different portions of the fluid carrier 118 as the substrate 116 moves in the feed direction 114, the magnetically-orientable flakes or particles in the region 506 resulting from the application of the magnetic field may have orientations and dihedral angle values that differ along a gradient as shown in FIG. 5A. That is, different portions of the fluid carrier 118 may be under the influence of different vector forces 202 (FIG. 2A) and thus may have different orientations and dihedral angle values when radiation is applied onto the fluid carrier 118 through the wedge-shaped opening 504.

The magnetically-orientable flakes in the regions 508 and 510 may not have been exposed to the same inclining and declining portions of the magnetic field lines 202 in the process of solidifying the region 506. Instead, the magnetically-orientable flakes in the regions 508 and 510 may be aligned in the direction of different-perhaps declining portions of the magnetic lines 202. That is, the regions 508 and 510 may be exposed to radiation from the radiation source 120 when the regions 508 and 510 come out from under the mask 502 and may thus at least begin to solidify, e.g., become cured, at least partially fixing the magnetically-orientable flakes in their instant orientations. While the regions 508 and 510 begin to solidify, the magnetically-orientable flakes in those regions may be aligned with the declining portion 224 of the magnetic field lines 202. As a result, the magnetically-orientable flakes in the regions 508 and 510 may have orientations and dihedral angle values that are different as compared with the orientations and dihedral angle values of the magnetically-orientable flakes in the region 506.

Figure 5B:
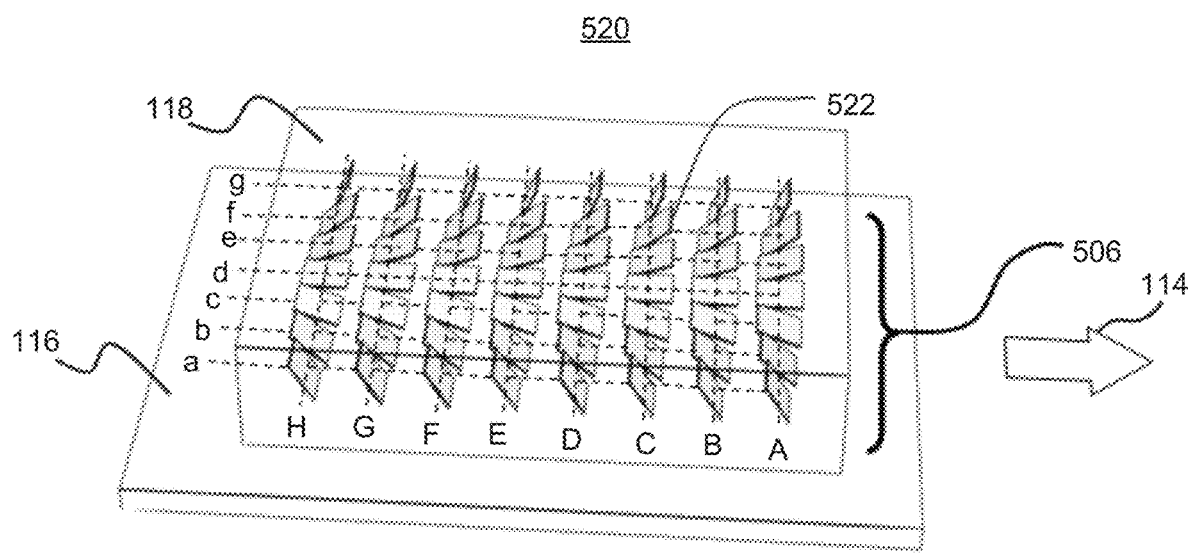
FIG. 5B shows a simplified isometric view of the magnetically-orientable flakes contained in a region of the fluid carrier depicted in FIG. 5A, according to an example of the present disclosure.

According to examples, the use of the wedge-shaped opening 504 in the mask 502 may result in the magnetically-orientable flakes in the region 506 having a helical arrangement with respect to each other along the direction perpendicular or transverse to the feed direction 114 and within the plane of substrate 116. A simplified example of the magnetically-orientable flakes in the region 506 arranged in a gradient is depicted in FIG. 5B. FIG. 5B, particularly, depicts a simplified isometric view 520 of the magnetically-orientable flakes contained in the region 506 of the fluid carrier 118 depicted in FIG. 5A. In other examples, a similar effect may be obtained through use of a mask in which the angled section has a stepped configuration.

In FIG. 5B, the magnetically-orientable flakes 522 are depicted as being arranged in the fluid carrier 118 along longitudinal rows of an array of magnetically-orientable flakes 522 in the region 506. As shown, all of the magnetically-orientable flakes 522 in each of the rows "a-g" may be oriented at the same dihedral angle with respect to the major plane of the substrate 116. That is, all of the magnetically-orientable flakes 522 in row "a" may be oriented at the same angle $\alpha_a$ with respect to the major plane of the substrate 116 and the direction of substrate motion 114, in which the angle $\alpha_a$ is between about $90°<\alpha_a<180°$. Likewise, the magnetically-orientable flakes 522 in row "b" may be oriented at the same angle $\alpha_b$ with respect to the major plane of the substrate 116 and the direction of substrate motion 114, in which the angle $\alpha_b$ differs from the angle $\alpha_a$. The angle of tilt of the magnetically-orientable flakes 522 in the remaining rows c-g may also differ from the tilt angles of the magnetically-orientable flakes 522 in the other rows.

In FIG. 5B, the magnetically-orientable flakes 522 are also depicted as being arranged in the fluid carrier 118 along transverse columns of an array in the region 506. The values of the tilt angles of the magnetically-orientable flakes 522 along each of the transverse columns "A"-"H" vary in a step-wise fashion. For instance, the values of the tilt angles in the transverse columns "A"-"H" change from the value of angle $\delta_1$ (shown in FIG. 5B as being in the range $180°>\delta_1>90°$) to the angle $\delta_n$ (shown in FIG. 5B as being in the range $90°>\delta_n>0°$). As a result of this variation in the value of tilt angles along a string of magnetically-orientable flakes 522 in a single transverse column "A", the magnetically-orientable flakes 522 may form a helical orientation along the direction orthogonal to the direction of motion and lying within the plane of the substrate 116.

Figure 5C:
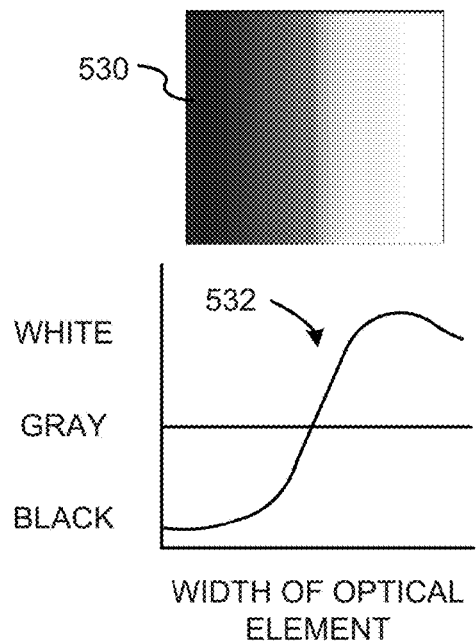
FIGS. 5C-5F, respectively, show diagrams and graphs of an optical element at different tilt angles, according to examples of the present disclosure.

The shifting optical effects of the magnetically-orientable flakes 522 in the region 506 are further shown and described with respect to FIGS. 5C-5F. Each of FIGS. 5C-5F shows an example of an optical element 530 at different tilt angles. The optical element 530 may be an optical security device, which may be provided on a banknote, stock certificate, or the like. FIG. 5C depicts the optical characteristics of the optical element 530 when the optical element 530 is viewed at a first angle, e.g., from a direction close to normal to the optical element 530. The graph 532 shows that the left side of the optical element 530 appears black (e.g., dark), that the right side of the optical element 530 appears white (e.g., bright), and that the optical element 530 gradually changes from black to white from the left side to the right side of the optical element 530.

Figure 5D:
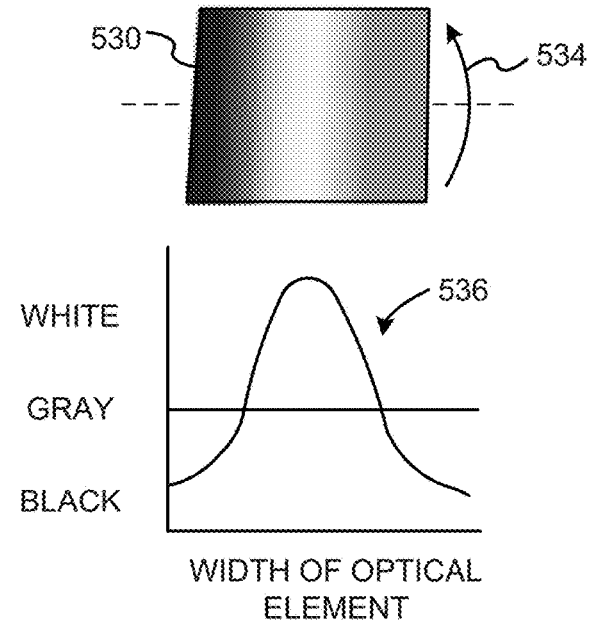

FIG. 5D depicts an example of the optical characteristics of the optical element 530 when the optical element 530 is tilted away from an observer as noted by the arrow 534. For instance, the top of the optical element 530 may be tilted about 15°-25° away from the observer. The graph 536 shows that both the left side of the optical element 530 and the right side of the optical element 530 appear black (e.g., dark) and that the center of the optical element 530 appears white (e.g., bright). As shown, as the top portion of the optical element 530 is tilted away from an observer, a bright band may appear to move from the right side of the optical element 530 to the left side of the optical element 530. In other words, the magnetically-orientable flakes 522 in the optical element 530 may be oriented such that tilting of the optical element 530 in one direction (e.g., top to bottom) results in an optical shift in the opposite direction (e.g., right to left).

Figure 5E:
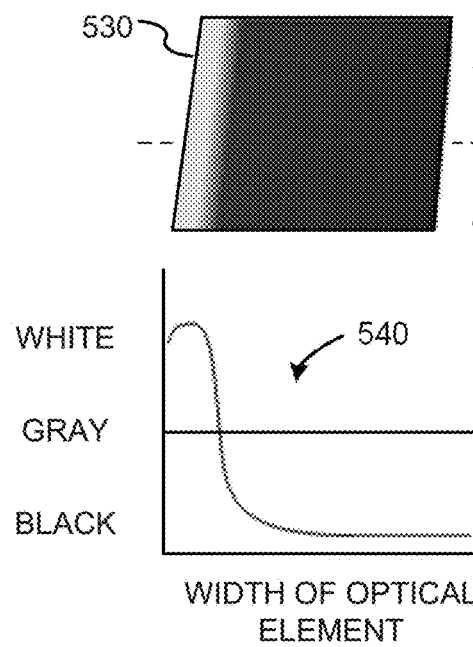

FIG. 5E depicts an example of the optical characteristics of the optical element 530 when the top portion of the optical element 530 is tilted further away from the observer. For instance, the top of the optical element 530 may be tilted to an angle greater than about 25° away from the observer as shown by the arrow 538. The graph 540 shows that the left side of the optical element 530 appears white (e.g., bright) and that the remainder of the optical element 530 appears black (e.g., dark). As shown, as the top portion of the optical element 530 is further tilted away from an observer, the bright band may appear to move to the left side of the optical element 530.

Figure 5F:
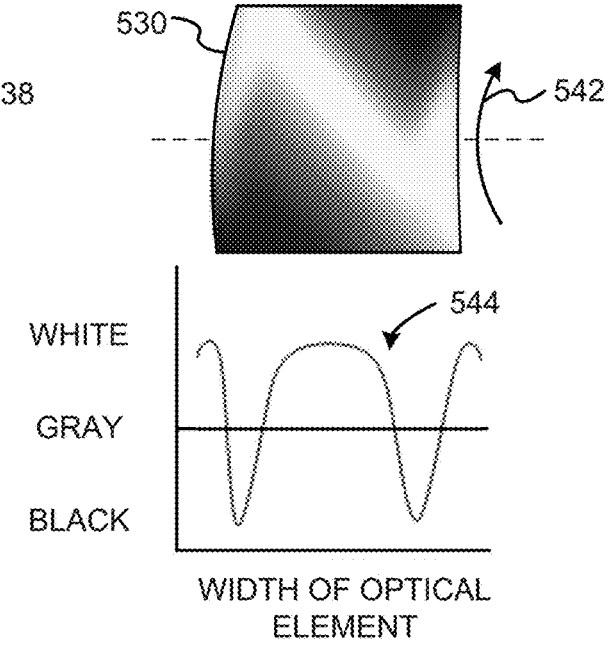

FIG. 5F depicts an example of the optical characteristics of the optical element 530 when the optical element 530 is flexed diagonally as noted by the arrow 542. As shown, a Z-shaped white band may be visible as the optical element 530 is flexed diagonally. The graph 544 shows the visible Z-shaped band graphically.

Although the optical element 530 has been depicted as having a square shape, it should be understood that the optical element 530 may have any shape.

Figure 6A:
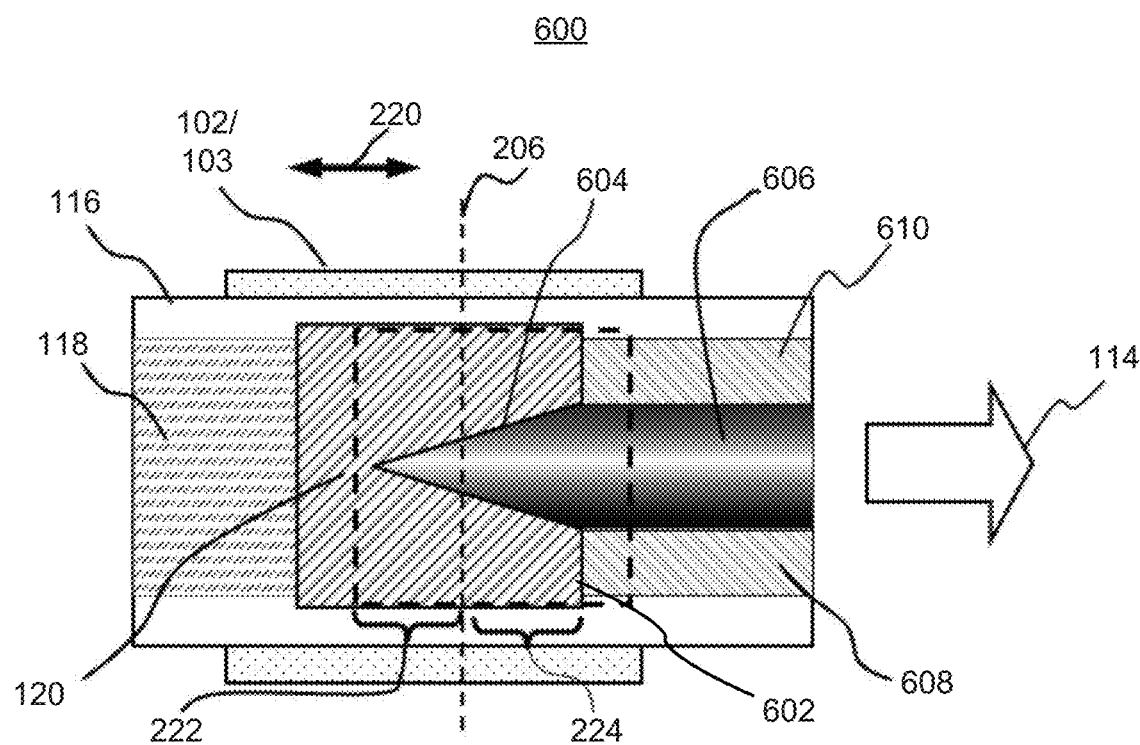
FIG. 6A shows a simplified top view of an apparatus for orienting magnetically-orientable flakes, according to another example of the present disclosure.

Turning now to FIG. 6A, there is shown a top view of an apparatus 600 for orienting magnetically-orientable flakes according to another example of the present disclosure. The apparatus 600 depicted in FIG. 6A includes many of the same features as those described above with respect to FIG. 5A and thus, those common features will not be described in detail with respect to FIG. 6A. However, the apparatus 600 depicted in FIG. 6A differs from the apparatus 500 depicted in FIG. 5A in that the wedge-shaped (or triangular-shaped) opening 604 in the mask 602 contains two sides of an isosceles or equilateral triangle. As the triangular-shaped opening 604 will result in the application of radiation from the radiation source 120 on different portions of the fluid carrier 118 as compared with the wedge-shaped opening 504, the magnetically-orientable flakes or particles in the region 606 resulting from the application of the magnetic field may have orientations that differ along a gradient as shown in FIG. 6A. That is, different portions of the fluid carrier 118 may be under the influence of different vector forces (shown schematically as magnetic field lines 202) (FIG. 2A) and thus may have different orientations when energy is applied onto the fluid carrier 118 through the opening 604.

The magnetically-orientable flakes in the regions 608 and 610 may not have been exposed to the same inclining and declining portions of the magnetic field lines 202 in the process of solidifying the region 606. Instead, the magnetically-orientable flakes in the regions 608 and 610 may be aligned in the direction of different-perhaps declining portions of the magnetic lines 202. That is, the regions 608 and 610 may be exposed to radiation from the radiation source 120 when the regions 608 and 610 come out from under the mask 602 and may thus at least begin to solidify, e.g., become cured, at least partially fixing the magnetically-orientable flakes in their instant orientations. While the regions 608 and 610 at least partially solidify, the magnetically-orientable flakes in those regions may be aligned with the declining portion 224 of the magnetic field lines 202. As a result, the magnetically-orientable flakes in the regions 608 and 610 may have orientations and dihedral angle values that are different as compared with the orientations and dihedral angle values of the magnetically-orientable flakes in the region 606.

Figure 6B:
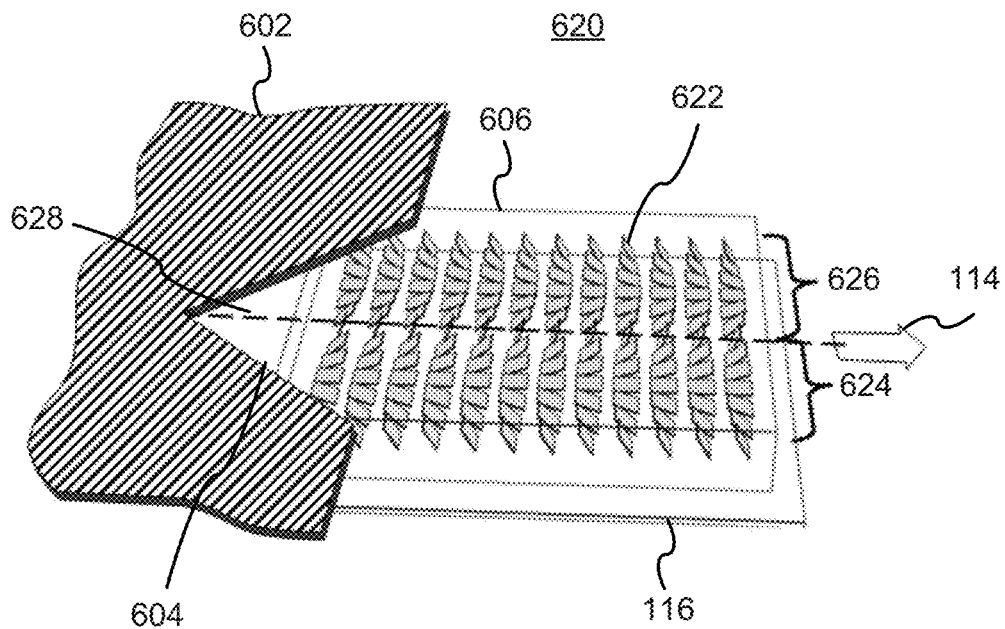
FIG. 6B shows a simplified isometric view of the magnetically-orientable flakes contained in a region of the fluid carrier depicted in FIG. 6A, according to an example of the present disclosure.

According to examples, the use of the wedge-shaped opening 604 in the mask 602 may result in the magnetically-orientable flakes in the region 606 having a bi-helical arrangement with respect to each other along the direction perpendicular to the feed direction 114 and within the plane of substrate 116. A simplified example of the magnetically-orientable flakes in the region 606 arranged in a gradient is depicted in FIG. 6B. FIG. 6B, particularly, depicts a simplified isometric view 620 of the magnetically-orientable flakes contained in the region 606 depicted in FIG. 6A. In other examples, a similar effect may be obtained through use of a mask in which the angled sections each has a stepped configuration.

In FIG. 6B, the magnetically-orientable flakes 622 are depicted as being arranged along longitudinal rows of an array of magnetically-orientable flakes 622 in the region 606, which is depicted as be composed of two sections 624 and 626. Each of the sections 624 and 626 is depicted as being arranged on opposite sides of a center line 628 that coincides with the tip of the triangular-shaped opening 604. As shown, each of the subset of magnetically-orientable flakes 622 in adjacent, longitudinally-extending rows may be oriented at the same dihedral angle with respect to the major plane of the substrate 116. That is, all of the magnetically-orientable flakes 622 in one of the rows in the first section 624 may be oriented at the same angle $\alpha$ with respect to the major plane of the substrate 116 and the direction of substrate motion 114, in which the angle $\alpha$ is between about $0°<\alpha<180°$. Likewise, the magnetically-orientable flakes 622 in a second row of the first section 624 may be oriented at the same angle $\alpha'$ with respect to the major plane of the substrate 116 and the direction of substrate motion 114, in which the angle $\alpha'$ differs from the angle $\alpha$. The dihedral angle of the magnetically-orientable flakes 622 in the remaining longitudinally extending rows may also differ from the dihedral angles of the magnetically-orientable flakes 622 in the other rows.

Figure 6C:
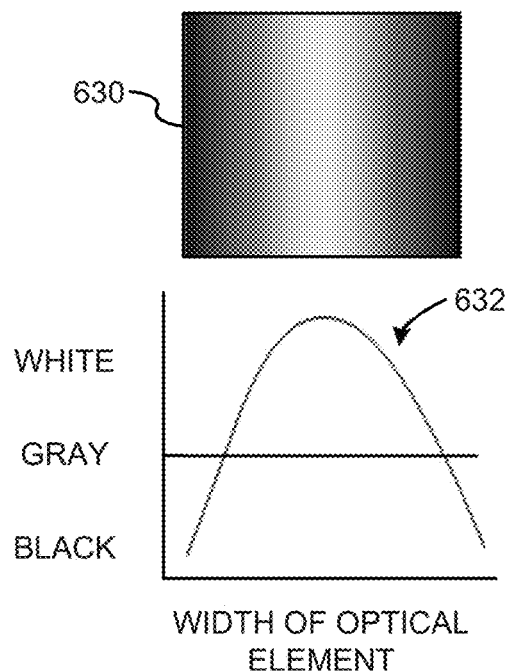
FIGS. 6C-6E, respectively, show diagrams and graphs of an optical element at different tilt angles, according to examples of the present disclosure.
Figure 6D:
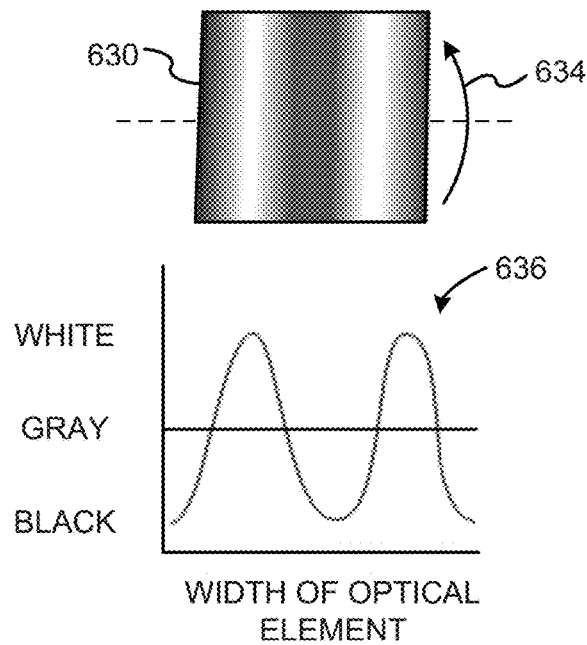
Figure 6E:
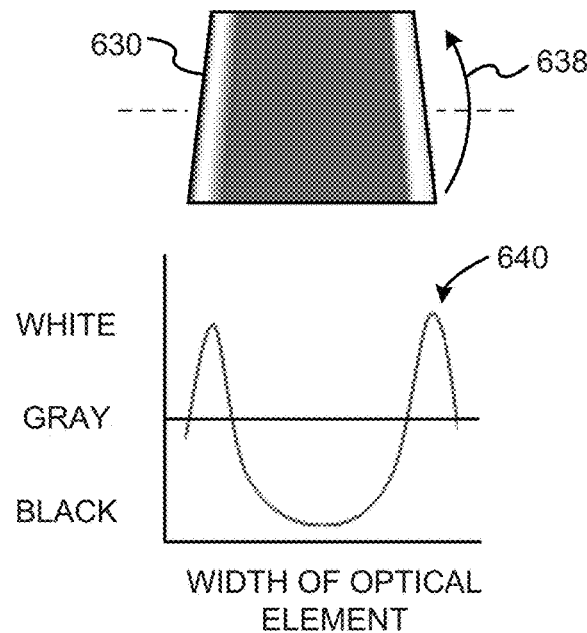

In FIG. 6B, the magnetically-orientable flakes 622 are also depicted as being arranged in the fluid carrier along transverse columns of an array in the region 606. The values of the dihedral angles of the magnetically-orientable flakes 622 along each of the transverse columns in the first section 624 vary in a step-wise fashion. For instance, the values of the tilt angles in the transverse columns change from the value of angle $\delta_1$ (shown in FIG. 6B as being in the range $0°<_1<180°$) to the angle $\delta_n$. As a result of this variation in the value of dihedral angles along a string of magnetically-orientable flakes 622 in a single transverse column of the first section 624, the magnetically-orientable flakes 622 in the first section 624 may form a helical orientation. The magnetically-orientable flakes 622 in the transverse columns of the second section 626 may be arranged and oriented to have a different helical orientation. The magnetically-orientable flakes 622 in the two sections 624 and 626 may be arranged and oriented in a mirror copy configuration to provide a clockwise helical configuration to the magnetically-orientable flakes in second section 626 and to provide a counter-clockwise helical configuration to the magnetically-orientable flakes in first section 624. As such, the magnetically-orientable flakes in each of the transverse columns of magnetically-orientable flakes 622 in the region 606 may have bi-helical orientations as shown in FIG. 6B. The shifting optical effects of the magnetically-orientable flakes 622 in the region 606 are further shown and described with respect to FIGS. 6C-6E. Each of FIGS. 6C-6E shows an example of an optical element 630 at different tilt angles. The optical element 630 may be an optical security device, which may be provided on a banknote, stock certificate, or the like. FIG. 6C depicts the optical characteristics of the optical element 630 when the optical element 630 is viewed at a first angle, e.g., from a direction normal or close to normal to the optical element 630. The graph 632 shows that the center of the optical element 630 appears white (e.g., bright) and that the optical element 630 gradually gets more black (e.g., darker) closer to the left and right sides of the optical element 630.

FIG. 6D depicts an example of the optical characteristics of the optical element 630 when the top portion of the optical element 630 is tilted away from an observer as noted by the arrow 634. For instance, the top of the optical element 630 may be tilted about 15° away from the observer. The depiction of the optical element 630 shows that the wide bright band shown in FIG. 6C may be split into two bright bands of smaller widths that simultaneously move to the left and right edges of the optical element 630. The graph 636 shows that tilting of the optical element 630 may result in two white peaks. In other words, the magnetically-orientable flakes 622 in the optical element 630 may be oriented such that tilting of the optical element 530 in one direction (e.g., top to bottom) results in multiple optical shifts in the opposite direction (e.g., left to right and right to left).

FIG. 6E depicts an example of the optical characteristics of the optical element 630 when the top portion of the optical element 630 is tilted further away from the observer. For instance, the top of the optical element 630 may be tilted to an angle greater than about 15° away from the observer as shown by the arrow 638. As shown, the further tilting may cause the white bands to get closer to the left and right edges and to become narrower. In addition, the darker zone near the center of the optical element 630 may become wider. The graph 640 shows that the white peaks are closer to the edges and have become narrower while the darker zone in the middle has increased in width.

Although the optical element 630 has been depicted as having a square shape, it should be understood that the optical element 630 may have any shape.

With reference now to FIGS. 7-10, there are respectively shown flow diagrams of methods 700-1000 for orienting magnetically-orientable flakes, according to an example of the present disclosure. The methods 700-1000 are described with respect to the apparatuses 100, 200, 500, and 600 discussed above. It should, however, be understood that the methods 700-1000 may be implemented by apparatuses having other configurations than those configurations of the apparatuses 100, 200, 500, and 600. Each of methods 700-1000 is merely exemplary. Methods 700-1000 may include greater or lesser steps. The steps of methods 700-1000 may be performed in any order.

With reference first to FIG. 7, at block 702, a fluid carrier 118 containing magnetically-orientable flakes may optionally be applied onto a substrate 116. Application of the fluid carrier 118 may be optional in instances in which the fluid carrier 118 has previously been applied onto the substrate 116.

At block 704, the substrate 116 and the fluid carrier 118 may be moved through a magnetic field. As described herein, the magnetic field may influence the magnetically-orientable flakes in the fluid carrier 118 to be respectively oriented in one of multiple orientations. The multiple orientations may be dihedral angles with respect to the plane of the substrate 116. According to examples, the magnetic field has a strength of at least 0.0001 tesla.

At block 706, during movement of the substrate 116 through the magnetic field, radiation may be applied onto a plurality of selected portions of the fluid carrier 118 through at least one opening 124 in a mask 122 to cure the fluid carrier 118 at the plurality of selected portions and fix the magnetically-orientable flakes in the plurality of selected portions at the respective angular orientations as influenced by the magnetic field. According to examples, radiation may be applied to cause the magnetically-orientable flakes in a first selected portion to be fixed at a first orientation and the magnetically-orientable flakes in a second selected portion to be fixed at a second orientation, in which the first orientation differs from the second orientation. Radiation may also be applied to cause the magnetically-orientable flakes in a third selected portion to be fixed at a third orientation, in which the third orientation differs from the first orientation and the second orientation.

As discussed herein, the substrate 116 may be moved along a feed direction 114 through the magnetic field and radiation may be applied to fix the magnetically-orientable flakes in the plurality of selected portions at respective orientation angles that are different from the orientation angle of magnetically-orientable flakes in other portions and are also different from the intersecting angles with respect to a plane that extends along the feed direction 114 and is tangent to the substrate 116 surface. In addition, radiation may be applied onto the plurality of selected portions when the magnetically-orientable flakes in the plurality of selected portions are substantially aligned with respective vector forces of the magnetic field. Moreover, the magnetic field may be generated by at least one stationary magnet 102 and the substrate 116 may be moved between the mask 122 and the magnet 102. In one example, the substrate 116 may be moved at a speed of at least about 0.3 meters/min (1 ft/min). In other examples, the substrate 116 may be moved at a speed from about 1.5 meters/min (5 ft/min) to about 180 meters/min (600 ft/min).

Turning now to FIG. 8, at block 802, a substrate 116 may be moved in a first direction 114 through a magnetic field and a radiation footprint providing radiation. The magnetic field may have a strength of at least 0.0001 tesla. The ink (e.g., fluid carrier 118) with magnetically-orientable flakes is disposed on the substrate 116 and the radiation footprint has a leading edge. The magnetic field may also be generated by at least one magnet 102 and the radiation footprint may be stationary relative to the at least one magnet 102.

At block 804, during movement of the substrate 116 through the magnetic field, radiation may be applied to a portion of the substrate 116 when the portion of the substrate 116 is in an extent of the leading edge along the first direction 114. As discussed above, the leading edge of the radiation footprint may vary in the feed direction 114 and may be provided through an opening 124 in a mask 122. Additionally, the leading edge may have a continuous edge having at least a 2 mm extent in the first direction and at least a 2 mm extent in a direction normal to the first direction and parallel to the plane of the substrate 116.

With reference now to FIG. 9, at block 902, a substrate 116 with a fluid carrier deposited thereon may be moved relative to an external magnetic induction and a radiation footprint to provide curing radiation. The fluid carrier may include magnetically-orientable flakes and the radiation footprint may have a leading edge with non-zero extent in the direction of substrate motion.

At block 904, the fluid carrier may be cured with the curing radiation as the fluid carrier is moving in the radiation footprint. The fluid carrier may be partially or completely cured while moving in the radiation footprint. In some examples, the leading edge of the radiation footprint may be the points on the substrate that are first exposed to the curing radiation as the substrate moves in the feed direction. In some examples, the fluid carrier begins to cure as the fluid carrier passes the leading edge. In addition, for at least part of the leading edge, the external magnetic induction has an orthogonal projection onto a plane and contains a substrate velocity vector, in which the plane is normal to the substrate 116. The orthogonal projection may vary in direction by at least 0.01 radians and may have a strength of at least 0.0001 tesla. The orthogonal projection may vary in direction by at least 0.05 radians. According to examples, the leading edge has an extent in the direction of substrate motion of at least 2 mm and may have a continuous edge. The continuous edge may also have at least a 2 mm extent along the substrate 116 in a direction normal to the direction of substrate motion. In addition, or alternatively, the radiation footprint may be stationary relative to the external magnetic induction.

Turning now to FIG. 10, at block 1002, a substrate 116 with fluid carrier 118 deposited thereon may be moved relative to an external magnetic induction and a radiation footprint to provide curing radiation. The fluid carrier 118 (or ink) may include magnetically-orientable flakes and the radiation footprint may have a leading edge with non-zero extent in the direction of substrate motion. For instance, the leading edge may include a continuous edge having an extent in the direction of substrate motion of at least 2 mm. The continuous edge may additionally or alternatively have at least a 2 mm extent along the substrate in a direction normal to the direction of substrate motion.

At block 1004, the magnetically-orientable flakes may be oriented by the external magnetic induction, in which the value of the dihedral angle of orientation may vary by at least 0.01 radians along at least part of the leading edge.

At block 1006, the fluid carrier 118 may be cured with the curing radiation as the fluid carrier 118 is moving in the radiation footprint. The fluid carrier 118 may first be exposed to the curing radiation at the radiation footprint. In some examples, the fluid carrier 118 begins to cure as the fluid carrier passes the leading edge. According to examples, the radiation footprint may be stationary relative to the external magnetic induction and may be provided through illumination of an opening 124 in a mask 122 with a radiation source 120. In addition, or alternatively, the orthogonal projection of the external magnetic induction may have a strength of at least 0.001 tesla and the magnetic induction may vary in direction by at least 0.05 radians.

According to examples, any or all of the methods 700-1000 disclosed herein may be performed at multiple stations of an apparatus 100 such that articles may be fabricated to include multiple layers of fluid carriers as discussed above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An optical element, comprising:
   a coating provided on a first region of a substrate, the coating comprising a cured fluid carrier in which magnetically-orientable flakes are oriented with a first dihedral angle along a first direction of the substrate; and
   wherein the coating is further provided on a second region of the substrate, the coating comprising the cured fluid carrier in which magnetically-orientable flakes are oriented with a second dihedral angle along the first direction of the substrate;
   wherein the second dihedral angle is greater than the first dihedral angle and forms a helical configuration along a second direction of the substrate orthogonal to the first direction of the substrate;
   wherein the magnetically-orientable flakes are arranged in a plurality of columns and oriented in a step-wise dihedral angle with respect to a major plane of the substrate to form the helical configuration; and
   wherein each column of the plurality of columns has the same helical configuration.

2. The optical element of claim 1, wherein the first region is a longitudinal row of magnetically-orientable flakes with the first dihedral angle; and the second region is another longitudinal row of magnetically-orientable, planar flakes with the second dihedral angle.

3. The optical element of claim 1, wherein the first region of the magnetically-orientable flakes has a dihedral angle $\alpha$ with respect to a major plane of the substrate, wherein $\alpha$ is in a range of about $0°<\alpha<90°$ in the first direction.

4. The optical element of claim 3, wherein the second region of the magnetically-orientable flakes has a dihedral angle $\beta$ with respect to the major plane of the substrate, wherein $\beta$ is in a range of about $0°<\beta<90°$ in the first direction.

5. The optical element of claim 1, wherein the magnetically-orientable flakes in the first region and the second region are oriented in a manner that causes an orthoparallactic effect as the substrate is tilted.

6. The optical element of claim 1, wherein the coating is on additional regions of the substrate, and wherein the coating in each additional region comprises the cured fluid carrier in which the magnetically-orientable flakes are arranged to form a plurality of rows and the plurality of columns.

7. The optical element of claim 6, wherein magnetically-orientable flakes arranged in each row are oriented at a same dihedral angle with respect to a major plane of the substrate; and
   wherein each row in the plurality of rows are oriented at a different dihedral angle with respect to other rows.

* * * * *